(12) United States Patent  
Zhu et al.

(10) Patent No.: US 11,818,641 B2
(45) Date of Patent: Nov. 14, 2023

(54) LOCAL AREA NETWORK COMMUNICATION METHOD, DEVICE, AND SYSTEM

(71) Applicant: Huawei Technologies Co., Ltd., Shenzhen (CN)

(72) Inventors: Qianghua Zhu, Beijing (CN); Wenfu Wu, Shanghai (CN); Qi Yao, Beijing (CN); Yanping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 417 days.

(21) Appl. No.: 17/213,828

(22) Filed: Mar. 26, 2021

(65) Prior Publication Data

US 2021/0219206 A1 Jul. 15, 2021

Related U.S. Application Data

(63) Continuation of application No. PCT/CN2019/107780, filed on Sep. 25, 2019.

(30) Foreign Application Priority Data

Sep. 28, 2018 (CN) .......................... 201811146963.7

(51) Int. Cl.
*H04W 40/02* (2009.01)
*H04W 76/20* (2018.01)
(Continued)

(52) U.S. Cl.
CPC .............. *H04W 40/02* (2013.01); *H04L 45/74* (2013.01); *H04W 76/20* (2018.02); *H04W 84/12* (2013.01)

(58) Field of Classification Search
None
See application file for complete search history.

(56) References Cited

U.S. PATENT DOCUMENTS

2018/0192390 A1 7/2018 Li et al.
2018/0279397 A1* 9/2018 Faccin ................. H04W 76/11
(Continued)

FOREIGN PATENT DOCUMENTS

CN 104349388 A 2/2015
CN 108401275 A 8/2018
(Continued)

OTHER PUBLICATIONS

Huawei, "Update to Solution 15: Support of traffic routing in Backbone UP," 3GPP TSG-SA WG2 Meeting #129, S2-1810787, Dongguan, China, Oct. 15-19, 2018, 8 pages.

(Continued)

*Primary Examiner* — Brian S Roberts
(74) *Attorney, Agent, or Firm* — Conley Rose, P.C.

(57) ABSTRACT

A local area network communication method, a device, and a system, to implement private communication across session management network elements for a local area network service. The method includes: determining, based on indication information of a local area network, first path information associated with a first address, where the first path information indicates routing data whose destination address is the first address to a first user plane network element, and where the first user plane network element provides access to the local area network for a terminal corresponding to the first address; and sending a first message to a second session management network element, for configuring a first routing rule on the second user plane network element, where the first routing rule includes the indication information of the local area network, the first address, and the first path information.

20 Claims, 9 Drawing Sheets

(51) Int. Cl.
*H04L 45/74* (2022.01)
*H04W 84/12* (2009.01)

(56) References Cited

U.S. PATENT DOCUMENTS

2019/0059067 A1* 2/2019 Lee .................. H04W 28/10
2019/0394833 A1* 12/2019 Talebi Fard ........ H04W 68/005
2020/0205208 A1 6/2020 Hu et al.

FOREIGN PATENT DOCUMENTS

| JP | 2018056868 A | 4/2018 | | |
|---|---|---|---|---|
| JP | 2020532245 A | 11/2020 | | |
| WO | 2016134752 A1 | 9/2016 | | |
| WO | WO-2018006017 A1 | * | 1/2018 | ............ H04W 12/06 |
| WO | 2018171859 A1 | 9/2018 | | |

OTHER PUBLICATIONS

3GPP TR 23.726 V0.4.0, "3rd Generation Partnership Project; Technical Specification Group Services and System Aspects; Study on Enhancing Topology of SMF and UPFin 5G Networks (Release 16)," Jun. 2018, 68 pages.
InterDigital Inc., "Solution for 5GLAN Group Communication," SA WG2 Meeting #128-bis, S2-189053, Aug. 20-24, 2018, 4 pages.
Huawei, et al., "Solution for KI#4 and KI#5: Basic architecture for supporting dynamic 5G LAN-type service and 5GLAN communication," 3GPP TSG-SA WG2 Meeting #128bis, S2-189054, Sophia Antipolis, France, Aug. 20-24, 2018, 3 pages.
Huawei, et al., "Solution for KI#4 and KI#5: Basic architecture for supporting dynamic 5G LAN-type service and 5GLAN communication," 3GPP TSG-SA WG2 Meeting #128bis, S2-188383, Sophia Antipolis, France, Aug. 20-24, 2018, 3 pages.

* cited by examiner

LOCAL AREA NETWORK COMMUNICATION METHOD, DEVICE, AND SYSTEM

CROSS-REFERENCE TO RELATED APPLICATIONS

This application is a continuation of International Patent Application No. PCT/CN2019/107780, filed on Sep. 25, 2019, which claims priority to Chinese Patent Application No. 201811146963.7, filed on Sep. 28, 2018. The disclosures of the aforementioned applications are hereby incorporated by reference in their entireties.

TECHNICAL FIELD

This application relates to the field of communications technologies, and in particular, to a local area network communication method, a device, and a system.

BACKGROUND

A 5th generation (5G) local area network (5GLAN) service is a service provided by a current 5G network, and is mainly used in home communication, enterprise office, factory manufacturing, internet of vehicles, power grid reconstruction, a public security organization, and the like. The service can provide private communication of an Internet Protocol (IP) type or a non-IP type (for example, an Ethernet type) for two or more terminals in a group of terminals. For example, devices in a factory may constitute a group, and the devices in the group may send an Ethernet data packet to each other. Alternatively, office devices (such as mobile phones, computers, or laptop computers) of employees in a department of an enterprise may constitute a group, and the office devices send an IP packet to each other. If two terminals are not in a same group, the two terminals cannot communicate with each other.

Currently, the 5GLAN service provides point-to-point data transmission for terminals with wide coverage, for example, communication cross countries or cross provinces. For example, a 5GLAN service provides private communication for devices in office areas, located in different provinces, cities, or countries, of a transnational enterprise. In the conventional technology, if two terminals are far away from each other, a 5G network needs to select different session management function (SMF) network elements for the two terminals, to respectively manage sessions from the terminals to the 5GLAN service. In addition, the 5G network selects different user plane function (UPF) network elements for data transmission of the sessions of the terminals.

However, currently, there is no related solution to how to implement private communication across session management network elements for a local area network service.

SUMMARY

Embodiments of this application provide a local area network communication method, a device, and a system, to implement private communication across session management network elements for a local area network service.

To achieve the foregoing objective, the following technical solutions are used in the embodiments of this application.

According to a first aspect, a local area network communication method is provided. The method includes: A service management network element determines, based on indication information of a local area network, first path information associated with a first address. The first path information is used by a second user plane network element to route data whose destination address is the first address to a first user plane network element. The first user plane network element provides access to the local area network for a terminal corresponding to the first address. The service management network element sends a first message to a second session management network element, for configuring a first routing rule on the second user plane network element. The first routing rule includes the indication information of the local area network, the first address, and the first path information. According to the solution, the second user plane network element can route, according to the first routing rule, the data whose destination address is the first address to the first user plane network element. Therefore, private communication across session management network elements can be implemented for a local area network service.

In a possible design, the first address is an address of a first terminal, and the first message includes an identifier of the second user plane network element and the first routing rule. Before the service management network element determines, based on the indication information of the local area network, the first path information associated with the first address, the method further includes: The service management network element receives a second message from a first session management network element. The second message includes an identifier of the first user plane network element and an identifier of the local area network. Correspondingly, the indication information of the local area network is the identifier of the local area network. That the service management network element determines, based on the indication information of the local area network, the first path information associated with the first address includes: The service management network element determines the identifier of the second user plane network element based on the identifier of the local area network. The service management network element determines, based on the identifier of the local area network, the identifier of the second user plane network element, and the identifier of the first user plane network element, the first path information associated with the address of the first terminal. According to the solution, the service management network element can determine the first path information associated with the first address.

In a possible design, the second message further includes an identifier of the first terminal. After the service management network element receives the second message from the first session management network element, the method further includes: The service management network element determines the address of the first terminal corresponding to the identifier of the first terminal. The service management network element sends the address of the first terminal to the first session management network element, for configuring, on the first user plane network element, second path information that indicates routing to the first terminal. In other words, in this embodiment of this application, the service management network element may determine the address of the first terminal.

In a possible design, the second message further includes the address of the first terminal. In other words, in this embodiment of this application, the first session management network element may determine the address of the first terminal.

In a possible design, that the service management network element determines, based on the identifier of the local area network, the identifier of the second user plane network element, and the identifier of the first user plane network element, the first path information associated with the address of the first terminal includes: The service management network element determines, based on the identifier of the first user plane network element and the identifier of the local area network, that it is the first time for the first user plane network element to provide access to the local area network. The service management network element allocates, based on the identifier of the local area network, the identifier of the second user plane network element, and the identifier of the first user plane network element, the first path information associated with the address of the first terminal. In other words, in this embodiment of this application, the service management network element may allocate the first path information associated with the address of the first terminal.

In a possible design, after the service management network element determines that it is the first time for the first user plane network element to provide access to the local area network, the method further includes: The service management network element sends a third message to the first session management network element, for configuring a second routing rule on the first user plane network element. The second routing rule includes the indication information of the local area network, an address of a second terminal, and third path information. The third path information is used by the first user plane network element to route data whose destination address is the address of the second terminal to the second user plane network element. The second terminal is a terminal for which the second user plane network element provides access to the local area network. According to the solution, the first user plane network element can route, according to the second routing rule, the data whose destination address is the address of the second terminal to the second user plane network element. Therefore, private communication across session management network elements can be implemented for a local area network service.

In a possible design, that the service management network element determines, based on the identifier of the local area network, the identifier of the second user plane network element, and the identifier of the first user plane network element, the first path information associated with the address of the first terminal includes: The service management network element determines, based on the identifier of the local area network, that it is the first time for the first user plane network element to provide access to the local area network. The service management network element sends the indication information of the local area network, the identifier of the first user plane network element, and the identifier of the second user plane network element to the first session management network element, to request the first path information. The service management network element receives the first path information from the first session management network element. In other words, in this embodiment of this application, the first session management network element may allocate the first path information associated with the address of the first terminal.

In a possible design, the method further includes: The service management network element receives third path information from the second session management network element. The third path information is used by the first user plane network element to route data whose destination address is an address of a second terminal to the second user plane network element. The second terminal is a terminal for which the second user plane network element provides access to the local area network. The service management network element sends a third message to the first session management network element, for configuring a second routing rule on the first user plane network element. The second routing rule includes the indication information of the local area network, the address of the second terminal, and the third path information. According to the solution, the first user plane network element can route, according to the second routing rule, the data whose destination address is the address of the second terminal to the second user plane network element. Therefore, private communication across session management network elements can be implemented for a local area network service.

In a possible design, the first address is a destination address corresponding to data for which no path information can be matched by the second user plane network element. The first message includes the first path information. Before the service management network element determines, based on the indication information of the local area network, the first path information associated with the first address, the method further includes: The service management network element receives a fourth message from the second session management network element. The fourth message includes the indication information of the local area network, indication information of the second user plane network element, and the first address. Correspondingly, that the service management network element determines, based on the indication information of the local area network, the first path information associated with the first address includes: The service management network element determines an identifier of the first user plane network element based on the indication information of the local area network and the first address. The service management network element determines, based on the indication information of the local area network, the indication information of the second user plane network element, and the identifier of the first user plane network element, the first path information associated with the first address. According to the solution, the service management network element can determine the first path information associated with the first address.

In a possible design, the indication information of the second user plane network element is a second address, and the second address is a source address corresponding to the data for which no path information can be matched by the second user plane network element. After the service management network element receives the fourth message from the second session management network element, the method further includes: The service management network element sends a fifth message to a first session management network element, for configuring a third routing rule on the first user plane network element. The fifth message includes the indication information of the local area network, the second address, the identifier of the first user plane network element, and fourth path information. The third routing rule includes the indication information of the local area network, the second address, and the fourth path information. The fourth path information is used by the first user plane network element to route data whose destination address is the second address to the second user plane network element. According to the solution, the first user plane network element can route, according to the third routing rule, the data whose destination address is the second address to the second user plane network element. Therefore, private communication across session management network elements can be implemented for a local area network service.

In a possible design, the method further includes: The service management network element receives a sixth message from the second session management network element.

The sixth message includes the indication information of the local area network, an identifier of the second user plane network element, and the first address, and is used to cancel updating of path information associated with the indication information of the local area network, the first address, and the identifier of the second user plane network element. The service management network element stops, based on the sixth message, sending, to the second session management network element, the path information associated with the indication information of the local area network, the first address, and the identifier of the second user plane network element. According to the solution, updating of the path information associated with the indication information of the local area network, the first address, and the identifier of the second user plane network element can be canceled.

According to a second aspect, a local area network communication method is provided. The method includes: A second session management network element receives a first message from a service management network element. The second session management network element sends, based on the first message, a first routing rule to a second user plane network element, for configuring the first routing rule on the second user plane network element. The first routing rule includes indication information of the local area network, a first address, and first path information associated with the first address. The first path information is used by the second user plane network element to route data whose destination address is the first address to a first user plane network element. The first user plane network element provides access to the local area network for a terminal corresponding to the first address. According to the solution, the second user plane network element can route, according to the first routing rule, the data whose destination address is the first address to the first user plane network element. Therefore, private communication across session management network elements can be implemented for a local area network service.

In a possible design, before the second session management network element receives the first message from the service management network element, the method further includes: The second session management network element receives a first address report from the second user plane network element. The first address report includes the indication information of the local area network and the first address. Alternatively, the first address report includes the indication information of the local area network, the first address, and a second address. The first address is a destination address corresponding to data for which no path information can be matched by the second user plane network element. The second address is a source address corresponding to the data for which no path information can be matched by the second user plane network element. The second session management network element sends a fourth message to the service management network element. The fourth message includes the indication information of the local area network, indication information of the second user plane network element, and the first address, and is used to determine the first path information associated with the first address. In other words, in this embodiment of this application, the service management network element may determine the first path information associated with the first address.

In a possible design, the method further includes: The second session management network element receives a second address report from the second user plane network element. The second address report includes the indication information of the local area network and the first address. The second address report is triggered when the second user plane network element detects no data associated with the first address within a preset time. The second session management network element sends a sixth message to the service management network element. The sixth message includes the indication information of the local area network, an identifier of the second user plane network element, and the first address, and is used to cancel updating of path information associated with the indication information of the local area network, the identifier of the second user plane network element, and the first address. According to the solution, updating of the path information associated with the indication information of the local area network, the identifier of the second user plane network element, and the first address can be canceled.

In a possible design, the method further includes: The second session management network element sends a seventh message to the service management network element. The seventh message includes an identifier of the local area network, the second address, an identifier of the second session management network element, and the identifier of the second user plane network element, and is used to update information about a terminal connected to the local area network.

In a possible design, after the second session management network element receives the first message from the service management network element, the method further includes: The second session management network element determines that third path information corresponding to the first path information does not exist on the second user plane network element. The third path information is used by the first user plane network element to route data whose destination address is an address of a second terminal to the second user plane network element. The second terminal is a terminal for which the second user plane network element provides access to the local area network. The second session management network element sends the third path information to the service management network element. According to the solution, the service management network element can obtain the third path information.

According to a third aspect, a local area network communication method is provided. The method includes: A first session management network element determines first path information associated with an address of a first terminal. The first path information is used by a second user plane network element to route data whose destination address is the address of the first terminal to a first user plane network element. The first user plane network element provides access to a local area network for the first terminal. The first session management network element sends a first message to a second session management network element, for configuring a first routing rule on the second user plane network element. The first routing rule includes indication information of the local area network, the address of the first terminal, and the first path information. According to the solution, the second user plane network element can route, according to the first routing rule, the data whose destination address is the address of the first terminal to the first user plane network element. Therefore, private communication across session management network elements can be implemented for a local area network service.

In a possible design, before the first session management network element determines the first path information associated with the address of the first terminal, the method further includes: The first session management network element receives a second message from the service management network element. The second message includes an identifier of the second user plane network element. Correspondingly, that the first session management network element determines the first path information associated with the address of the first terminal includes: The first session management network element determines, based on the indication information of the local area network, an identifier of the first user plane network element, and the identifier of the second user plane network element, the first path information associated with the address of the first terminal. According to the solution, the first session management network element can determine the first path information associated with the address of the first terminal.

In a possible design, that the first session management network element determines, based on the indication information of the local area network, the identifier of the first user plane network element, and the identifier of the second user plane network element, the first path information associated with the address of the first terminal includes: The first session management network element determines, based on the indication information of the local area network and the identifier of the first user plane network element, that it is the first time for the first user plane network element to provide access to the local area network. The first session management network element allocates, based on the indication information of the local area network, the identifier of the first user plane network element, and the identifier of the second user plane network element, the first path information associated with the address of the first terminal. In other words, in this embodiment of this application, when it is the first time for the first user plane network element to provide access to the local area network, the first session management network element may allocate the first path information associated with the address of the first terminal.

In a possible design, the second message further includes an address of a second terminal. The second terminal is a terminal for which the second user plane network element provides access to the local area network. The method further includes: The first session management network element receives, from the second session management network element, third path information associated with the address of the second terminal. The third path information is used by the first user plane network element to route data whose destination address is the address of the second terminal to the second user plane network element. The first session management network element sends a second routing rule to the first user plane network element, for configuring the second routing rule on the first user plane network element. The second routing rule includes the indication information of the local area network, the address of the second terminal, and the third path information. According to the solution, the first user plane network element can route, according to the second routing rule, the data whose destination address is the address of the second terminal to the second user plane network element. Therefore, private communication across session management network elements can be implemented for a local area network service.

In a possible design, the method further includes: The first session management network element sends a third message to the service management network element. The third message includes an identifier of the first terminal or the address of the first terminal, an identifier of the first session management network element, the identifier of the first user plane network element, and an identifier of the local area network, and is used to update information about a terminal connected to the local area network.

According to a fourth aspect, a service management network element is provided. The service management network element has a function of implementing the method in the first aspect. The function may be implemented using hardware, or may be implemented using hardware executing corresponding software. The hardware or the software includes one or more modules corresponding to the foregoing function.

According to a fifth aspect, a service management network element is provided, including a processor and a memory. The memory is configured to store a computer-executable instruction. When the service management network element runs, the processor executes the computer-executable instruction stored in the memory, such that the service management network element performs the local area network communication method according to any one of the possible designs of the first aspect.

According to a sixth aspect, a service management network element is provided, including a processor. The processor is configured to: after being coupled to a memory and reading an instruction in the memory, perform, according to the instruction, the local area network communication method according to any one of the possible designs of the first aspect.

According to a seventh aspect, a computer-readable storage medium is provided. The computer-readable storage medium stores an instruction, and when the instruction is run on a computer, the computer is enabled to perform the local area network communication method according to any one of the possible designs of the first aspect.

According to an eighth aspect, a computer program product including an instruction is provided. When the computer program product runs on a computer, the computer is enabled to perform the local area network communication method according to any one of the possible designs of the first aspect.

According to a ninth aspect, an apparatus (for example, the apparatus may be a chip system) is provided. The apparatus includes a processor, configured to support a service management network element in implementing a function in the first aspect, for example, determining, based on indication information of a local area network, first path information associated with a first address. In a possible design, the apparatus further includes a memory. The memory is configured to store a program instruction and data that are necessary for the service management network element. When the apparatus is a chip system, the chip system may include a chip, or may include a chip and another discrete device.

For technical effects brought by any design of the fourth aspect to the ninth aspect, refer to technical effects brought by different designs of the first aspect. Details are not described herein again.

According to a tenth aspect, a second session management network element is provided. The second session management network element has a function of implementing the method in the second aspect. The function may be implemented using hardware, or may be implemented using hardware executing corresponding software. The hardware or the software includes one or more modules corresponding to the foregoing function.

According to an eleventh aspect, a second session management network element is provided, including a processor and a memory. The memory is configured to store a computer-executable instruction. When the second session management network element runs, the processor executes the computer-executable instruction stored in the memory, such that the second session management network element performs the local area network communication method according to any one of the possible designs of the second aspect.

According to a twelfth aspect, a second session management network element is provided, including a processor. The processor is configured to: after being coupled to a memory and reading an instruction in the memory, perform, according to the instruction, the local area network communication method according to any one of the possible designs of the second aspect.

According to a thirteenth aspect, a computer-readable storage medium is provided. The computer-readable storage medium stores an instruction, and when the instruction is run on a computer, the computer is enabled to perform the local area network communication method according to any one of the possible designs of the second aspect.

According to a fourteenth aspect, a computer program product including an instruction is provided. When the computer program product runs on a computer, the computer is enabled to perform the local area network communication method according to any one of the possible designs of the second aspect.

According to a fifteenth aspect, an apparatus (for example, the apparatus may be a chip system) is provided. The apparatus includes a processor, configured to support a second session management network element in implementing a function in the second aspect, for example, determining that third path information corresponding to the second path information does not exist on the second user plane network element. In a possible design, the apparatus further includes a memory. The memory is configured to store a program instruction and data that are necessary for the second session management network element. When the apparatus is a chip system, the chip system may include a chip, or may include a chip and another discrete device.

For technical effects brought by any design of the tenth aspect to the fifteenth aspect, refer to technical effects brought by different designs of the second aspect. Details are not described herein again.

According to a sixteenth aspect, a first session management network element is provided. The first session management network element has a function of implementing the method in the third aspect. The function may be implemented using hardware, or may be implemented using hardware executing corresponding software. The hardware or the software includes one or more modules corresponding to the foregoing function.

According to a seventeenth aspect, a first session management network element is provided, including a processor and a memory. The memory is configured to store a computer-executable instruction, and when the first session management network element runs, the processor executes the computer-executable instruction stored in the memory, such that the first session management network element performs the local area network communication method according to any one of the possible designs of the third aspect.

According to an eighteenth aspect, a first session management network element is provided, including a processor. The processor is configured to: after being coupled to a memory and reading an instruction in the memory, perform, according to the instruction, the local area network communication method according to any one of the possible designs of the third aspect.

According to a nineteenth aspect, a computer-readable storage medium is provided. The computer-readable storage medium stores an instruction, and when the instruction is run on a computer, the computer is enabled to perform the local area network communication method according to any one of the possible designs of the third aspect.

According to a twentieth aspect, a computer program product including an instruction is provided. When the computer program product runs on a computer, the computer is enabled to perform the local area network communication method according to any one of the possible designs of the third aspect.

According to a twenty-first aspect, an apparatus (for example, the apparatus may be a chip system) is provided. The apparatus includes a processor, configured to support a first session management network element in implementing a function in the third aspect, for example, determining first path information associated with an address of a first terminal. In a possible design, the apparatus further includes a memory. The memory is configured to store a program instruction and data that are necessary for the first session management network element. When the apparatus is a chip system, the chip system may include a chip, or may include a chip and another discrete device.

For technical effects brought by any design of the sixteenth aspect to the twenty-first aspect, refer to technical effects brought by different designs of the third aspect. Details are not described herein again.

According to a twenty-second aspect, a communications system is provided. The communications system includes a service management network element and a second session management network element. The service management network element is configured to: determine, based on indication information of a local area network, first path information associated with a first address; and send a first message to the second session management network element. The first path information is used by a second user plane network element to route data whose destination address is the first address to a first user plane network element. The first user plane network element provides access to the local area network for a terminal corresponding to the first address. The second session management network element is configured to: receive the first message from the service management network element; and send, based on the first message, a first routing rule to the second user plane network element, for configuring the first routing rule on the second user plane network element. The first routing rule includes the indication information of the local area network, the first address, and the first path information.

In a possible design, the first address is an address of a first terminal, a terminal corresponding to the first address is the first terminal, and the first message includes an identifier of the second user plane network element and the first routing rule. The communications system further includes a first session management network element. The first session management network element is configured to send a second message to the service management network element. The second message includes an identifier of the first user plane network element and an identifier of the local area network. Correspondingly, the indication information of the local area network is the identifier of the local area network. That the service management network element is configured to determine, based on the indication information of the local area network, the first path information associated with the first address includes: The service management network element is configured to: determine the identifier of the second user plane network element based on the identifier of the local area network; and determine, based on the identifier of the local area network, the identifier of the second user plane network element, and the identifier of the first user plane network element, the first path information associated with the address of the first terminal.

In a possible design, the service management network element is further configured to: after determining, based on the identifier of the first user plane network element and the identifier of the local area network, that it is the first time for the first user plane network element to provide access to the local area network, send a third message to the first session management network element. The first session management network element is further configured to: receive the third message from the service management network element, and send, based on the third message, a second routing rule to the first user plane network element, for configuring the second routing rule on the first user plane network element. The second routing rule includes the indication information of the local area network, an address of a second terminal, and third path information. The third path information is used by the first user plane network element to route data whose destination address is the address of the second terminal to the second user plane network element. The second terminal is a terminal for which the second user plane network element provides access to the local area network.

In a possible design, that the service management network element is configured to determine, based on the identifier of the local area network, the identifier of the second user plane network element, and the identifier of the first user plane network element, the first path information associated with the first address includes: determining, based on the identifier of the local area network, that it is the first time for the first user plane network element to provide access to the local area network; sending the indication information of the local area network, the identifier of the first user plane network element, and the identifier of the second user plane network element to the first session management network element, to request the first path information; and receiving the first path information from the first session management network element. The first session management network element is configured to: receive the indication information of the local area network, the identifier of the first user plane network element, and the identifier of the second user plane network element from the service management network element; allocate the first path information based on the indication information of the local area network, the identifier of the first user plane network element, and the identifier of the second user plane network element; and send the first path information to the service management network element.

In a possible design, the second session management network element is further configured to: determine that third path information corresponding to the first path information does not exist on the second user plane network element; and send the third path information to the service management network element. The third path information is used by the first user plane network element to route data whose destination address is an address of a second terminal to the second user plane network element. The second terminal is a terminal for which the second user plane network element provides access to the local area network. The service management network element is further configured to: receive the third path information from the second session management network element; and send a third message to the first session management network element. The first session management network element is further configured to: receive the third message from the service management network element; and send, based on the third message, a second routing rule to the first user plane network element, for configuring the second routing rule on the first user plane network element. The second routing rule includes the indication information of the local area network, the address of the second terminal, and the third path information.

In a possible design, the second session management network element is further configured to receive an address report from the second user plane network element. The address report includes the indication information of the local area network and the first address. The first address is a destination address corresponding to data for which no path information can be matched by the second user plane network element. The second session management network element is further configured to send a fourth message to the service management network element. The fourth message includes the indication information of the local area network, indication information of the second user plane network element, and the first address. The service management network element is further configured to receive the fourth message from the second session management network element. Correspondingly, that the service management network element is configured to determine, based on the indication information of the local area network, the first path information associated with the first address includes: The service management network element is configured to: determine an identifier of the first user plane network element based on the indication information of the local area network and the first address; and determine, based on the indication information of the local area network, the indication information of the second user plane network element, and the identifier of the first user plane network element, the first path information associated with the first address.

In a possible design, the address report further includes a second address, the indication information of the second user plane network element is the second address, and the second address is a source address corresponding to the data for which no path information can be matched by the second user plane network element. The communications system further includes a first session management network element. The service management network element is further configured to: after receiving the fourth message from the second session management network element, send a fifth message to the first session management network element. The fifth message includes the indication information of the local area network, the second address, the identifier of the first user plane network element, and fourth path information. The fourth path information is used by the first user plane network element to route data whose destination address is the second address to the second user plane network element. The first session management network element is further configured to: receive the fifth message from the service management network element, and send a third routing rule to the first user plane network element, for configuring the third routing rule on the first user plane network element. The third routing rule includes the indication information of the local area network, the second address, and the fourth path information.

For technical effects brought by any design of the twenty-second aspect, refer to technical effects brought by different designs in the first aspect or the second aspect. Details are not described herein again.

According to a twenty-third aspect, a communications system is provided. The communications system includes a first session management network element and a second session management network element. The first session management network element is configured to determine first path information associated with an address of a first terminal. The first path information is used by a second user plane network element to route data whose destination address is the address of the first terminal to a first user plane network element. The first user plane network element provides access to a local area network for the first terminal. The first session management network element is further configured to send a first message to the second session management network element. The second session management network element is configured to: receive the first message; and configure a first routing rule on the second session management network element. The first routing rule includes indication information of the local area network, the address of the first terminal, and the first path information.

For technical effects brought by any design of the twenty-third aspect, refer to technical effects brought by different design manners of the third aspect. Details are not described herein again.

These aspects or other aspects in this application may be clearer and intelligible in descriptions of the following embodiments.

DESCRIPTION OF EMBODIMENTS

The following describes the technical solutions in the embodiments of this application with reference to the accompanying drawings in the embodiments of this application. In the description of this application, "/" represents an "or" relationship between associated objects unless otherwise specified. For example, AB may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more than two. "At least one item (piece) of the following" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, terms such as "first", "second", and the like are used to distinguish same objects or similar objects whose functions and purposes are basically the same. A person skilled in the art may understand that the terms such as "first" and "second" do not limit a quantity or an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that as network architectures evolve and new service scenarios emerge, the technical solutions provided in the embodiments of this application are also applicable to similar technical problems.

Figure 1:
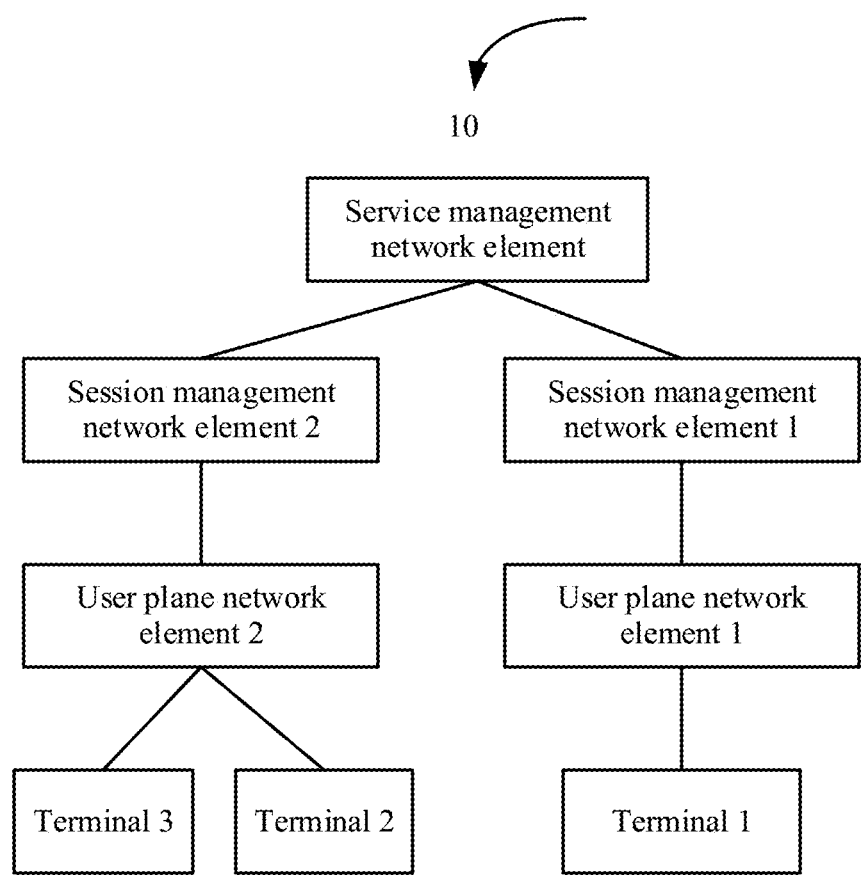
FIG. 1 is a schematic architectural diagram 1 of a communications system according to an embodiment of this application.

FIG. 1 shows a communications system 10 according to an embodiment of this application. The communications system 10 includes a service management network element, a session management network element 1 and a session management network element 2 that communicate with the service management network element, a user plane network element 1 managed by the session management network element 1, a terminal 1 for which the user plane network element 1 provides access to a local area network, a user plane network element 2 managed by the session management network element 2, and a terminal 2 and a terminal 3 for which the user plane network element 2 provides access to the local area network.

It should be noted that, in this embodiment of this application and the following embodiments, providing access to the local area network may also be described as providing a local area network service. A general description is provided herein, and details are not described below again.

It should be noted that FIG. 1 shows only two session management network elements (namely, the session management network element 1 and the session management network element 2) as an example. Certainly, there may be another session management network element that communicates with the service management network element, for example, a session management network element 3 or a session management network element 4. This is not specifically limited in this embodiment of this application.

It should be noted that FIG. 1 is described using merely an example in which one session management network element communicates with one user plane network element. For example, the session management network element 1 communicates with the user plane network element 1, and the session management network element 2 communicates with the user plane network element 2. Certainly, one session management network element may alternatively communicate with a plurality of user plane network elements. For example, the session management network element 1 may alternatively communicate with a user plane network element 3 or a user plane network element 4. Alternatively, the session management network element 2 may communicate with a user plane network element 5. This is not specifically limited in this embodiment of this application.

It should be noted that FIG. 1 is described using merely an example in which the user plane network element 1 provides access to the local area network for the terminal 1, or the user plane network element 2 provides access to the local area network for the terminal 2 and the terminal 3. Certainly, the user plane network element 1 may alternatively provide access to the local area network for a plurality of terminals. For example, the user plane network element 1 may alternatively provide access to the local area network for a terminal 4 or a terminal 5. Alternatively, the user plane network element 2 may provide access to the local area network for one terminal or more than two terminals. For example, the user plane network element 2 may alternatively provide access to the local area network for the terminal 5. This is not specifically limited in this embodiment of this application.

It should be noted that the network elements shown in FIG. 1 may communicate with each other or communicate through forwarding by another device. This is not specifically limited in this embodiment of this application.

On the basis of the communications system 10 shown in FIG. 1, assuming that the terminal 2 accesses a first local area network, the service management network element receives a message A that is sent by the session management network element 2 serving the terminal 2. The message A carries an identifier of the user plane network element 2 that provides access to the first local area network for the terminal 2, an identifier of the session management network element 2 that manages the user plane network element 2, an identifier of the first local area network, and at least one of an identifier of the terminal 2 or an address of the terminal 2. Then, the service management network element stores a correspondence between indication information that is of the first local area network and that corresponds to the identifier of the first local area network, the identifier of the session management network element 2, the identifier of the user plane network element 2, and at least one of the identifier of the terminal 2 or the address of the terminal 2. The indication information of the first local area network may be, for example, the identifier of the first local area network or a label of the first local area network. For related descriptions of the label of the first local area network, refer to the following embodiment shown in FIG. 5. Details are not described herein. If the indication information of the first local area network is the identifier of the first local area network, the indication information of the first local area network may be directly obtained from the message A. If the indication information of the first local area network is the label of the first local area network, the indication information of the first local area network may be obtained based on the identifier of the local area network that is obtained from the message A. This is not specifically limited in this embodiment of this application. In addition, if the message A does not include the address of the terminal 2, after receiving the message A that carries the identifier of the terminal 2, the service management network element may determine the address of the terminal 2 corresponding to the identifier of the terminal 2. For a determining manner, refer to descriptions in the following method embodiment, details are not described herein.

In addition, assuming that the terminal 3 accesses the first local area network, the service management network element receives a message F that is sent by the session management network element 2 serving the terminal 3. The message F carries the identifier of the user plane network element 2 that provides access to the first local area network for the terminal 3, the identifier of the session management network element 2 that manages the user plane network element 2, the identifier of the first local area network, and at least one of an identifier of the terminal 3 or an address of the terminal 3. Then, the service management network element stores a correspondence between the indication information that is of the first local area network and that corresponds to the identifier of the first local area network, the identifier of the session management network element 2, the identifier of the user plane network element 2, and at least one of the identifier of the terminal 3 or the address of the terminal 3. For related descriptions of the indication information of the first local area network, refer to the foregoing descriptions. Details are not described herein again.

If the terminal 1 accesses the first local area network after the terminal 2 and the terminal 3 access the first local area network, the service management network element receives a message B that is sent by the session management network element 1 serving the terminal 1. The message B carries an identifier of the user plane network element 1 that provides access to the first local area network for the terminal 1, an identifier of the session management network element 1 that manages the user plane network element 1, the identifier of the first local area network, and at least one of an identifier of the terminal 1 or an address of the terminal 1. Then, the service management network element stores a correspondence between the indication information that is of the first local area network and that corresponds to the identifier of the first local area network, the identifier of the session management network element 1, the identifier of the user plane network element 1, and at least one of the identifier of the terminal 1 or the address of the terminal 1. For related descriptions of the indication information of the first local area network, refer to the foregoing descriptions. Details are not described herein again. In addition, if the message B does not include the address of the terminal 1, after receiving the message B that carries the identifier of the terminal 1, the service management network element may determine the address of the terminal 1 corresponding to the identifier of the terminal 1. For a determining manner, refer to descriptions in the following method embodiment, details are not described herein.

Based on the foregoing scenario, the following four local area network communication methods in case 1 to case 4 are provided as examples, to implement private communication across session management network elements for a local area network service.

Case 1: In a process of creating or updating a session or another process, the service management network element may provide topology management and user plane path management for the local area network. In addition, the service management network element allocates path information.

For example, after the service management network element receives the message B, the service management network element may determine, based on the indication information of the first local area network in the message B and with reference to a correspondence, stored by the service management network element when one or more terminals access the first local area network, between the indication information of the local area network, an identifier of the session management network element, an identifier of the user plane network element, and at least one of an identifier of the one or more terminal or an address of the one or more terminal, whether another user plane network element currently provides access to the first local area network for another terminal. If another user plane network element currently provides access to the first local area network for another terminal, the service management network element may obtain corresponding path information in a first direction based on the indication information of the first local area network, an identifier of the other user plane network element, and the identifier of the user plane network element 1. The path information in the first direction is used by the other user plane network element to route data whose destination address is the address of the terminal 1 to the user plane network element 1. For example, with reference to the foregoing scenario, in this case, the service management network element may determine that the user plane network element 2 provides access to the first local area network for the terminal 2 and the terminal 3. Then, the service management network element may obtain path information 2 based on the indication information of the first local area network, the identifier of the user plane network element 2, and the identifier of the user plane network element 1. The path information 2 is used by the user plane network element 2 to route the data whose destination address is the address of the terminal 1 to the user plane network element 1. For example, the service management network element may obtain the path information 2 in the following manner: When it is the first time for the user plane network element 1 to provide access to the first local area network for the terminal 1 or any other terminal, the service management network element allocates the path information 2 based on the indication information of the first local area network, the identifier of the user plane network element 2, and the identifier of the user plane network element 1. After the service management network element allocates the path information 2, optionally, the service management network element may store a correspondence between the indication information of the first local area network, an identifier of a source user plane network element (which is the user plane network element 2 herein), an identifier of a target user plane network element (which is the user plane network element 1 herein), and the path information 2. Alternatively, when it is not the first time for the user plane network element 1 to provide access to the first local area network for the terminal 1 or any other terminal, the service management network element may query, based on the identifier of the user plane network element 1, the identifier of the user plane network element 2, and the indication information of the first local area network, the stored correspondence between the indication information of the first local area network, the identifier of the source user plane network element, the identifier of the target user plane network element, and the path information, to determine the corresponding path information 2. This is not specifically limited in this embodiment of this application.

Further, after the service management network element determines the corresponding path information in the first direction, the service management network element may send, to a corresponding session management network element, an identifier of a corresponding user plane network element and information related to the path information in the first direction. Then, the session management network element sends, to the user plane network element corresponding to the identifier of the user plane network element, the information related to the path information in the first direction, for configuring, on the user plane network element, the information related to the path information in the first direction. For example, with reference to the foregoing scenario, after obtaining the path information 2, the service management network element may send a routing rule 2 and the identifier of the user plane network element 2 to the session management network element 2 that manages the user plane network element 2. Then, the session management network element 2 may send the routing rule 2 to the corresponding user plane network element 2 based on the identifier of the user plane network element 2, for configuring the routing rule 2 on the user plane network element 2. The routing rule 2 includes the indication information of the first local area network, the address of the terminal 1, and the path information 2. In this way, after receiving the data whose destination address is the address of the terminal 1, the user plane network element 2 may route the data to the user plane network element 1 according to the routing rule 2. Then, the user plane network element 1 routes the data to the terminal 1 through a corresponding access device. This is not specifically limited in this embodiment of this application.

Optionally, in the foregoing scenario, it is assumed that it is the first time for the user plane network element 1 to provide access to the first local area network for the terminal 1 or any other terminal. In this case, after determining that another user plane network element currently provides access to the first local area network for another terminal, the service management network element may further allocate, based on the indication information of the first local area network, an identifier of the other user plane network element, and the identifier of the user plane network element 1, path information that is in a second direction and that corresponds to the path information in the first direction. The path information in the second direction is used by the user plane network element 1 to route, to a corresponding user plane network element, data whose destination address is an address of the other terminal. The other terminal herein is a terminal for which the corresponding user plane network element provides access to the first local area network. For example, with reference to the foregoing scenario, in this case, the service management network element may determine that the user plane network element 2 provides access to the first local area network for the terminal 2 and the terminal 3. Then, the service management network element may allocate path information 1 based on the indication information of the first local area network, the identifier of the user plane network element 2, and the identifier of the user plane network element 1. The path information 1 is used by the user plane network element 1 to route the data whose destination address is the address of the terminal 2 or the address of the terminal 3 to the user plane network element 2.

Further, after the service management network element allocates the corresponding path information in the second direction, the service management network element may send information related to the path information in the second direction to the session management network element 1. Then, the session management network element 1 sends the information related to the path information in the second direction to the corresponding user plane network element 1, for configuring, on the user plane network element 1, the information related to the path information in the second direction. For example, with reference to the foregoing scenario, after determining the path information 1, the service management network element may send a routing rule 1 to the session management network element 1. Then, the session management network element 1 sends the routing rule 1 to the corresponding user plane network element 1, for configuring the routing rule 1 on the user plane network element 1. The routing rule 1 includes the indication information of the first local area network, the address of the terminal 2, the address of the terminal 3, and the path information 1. In this way, after receiving the data whose destination address is the address of the terminal 2 or the address of the terminal 3, the user plane network element 1 may route the data to the user plane network element 2 according to the routing rule 1. Then, the user plane network element 2 routes the data to the terminal 2 or the terminal 3 through a corresponding access device. This is not specifically limited in this embodiment of this application.

In conclusion, according to the foregoing solution, private communication can be implemented between the terminal 1 for which the user plane network element 1 managed by the session management network element 1 provides a first local area network service, and the terminal 2 or the terminal 3 for which the user plane network element 2 managed by the session management network element 2 provides the first local area network service. In other words, private communication across session management network elements can be implemented for a local area network service.

Case 2: In a process of creating or updating a session or another process, the service management network element does not update path information in the local area network. Instead, for example, after completing session processing, the session management network element obtains, as required based on an address report configured on the user plane network element, a destination address of a data packet that cannot be processed; requests, from the service management network element, path information associated with the destination address; and updates the path information on the user plane network element in real time.

For example, a reporting rule may be configured on the user plane network element. The reporting rule may be as follows: When the user plane network element detects data sent to the first local area network and fails to match the data with user-plane path information, the user plane network element reports, to a corresponding session management network element, data description information such as a destination address and a source address (namely, a receiver address and a transmitter address of the data) that are corresponding to the data and the identifier of the first local area network.

Further, assuming that the terminal 1 sends data to the terminal 2, after the user plane network element 1 receives data whose destination address is the address of the terminal 2, if the user plane network element 1 detects that no forwarding path information can be matched for the data whose destination address is the address of the terminal 2, the user plane network element 1 sends an address report to the session management network element 1. The address report includes the indication information of the first local area and the address of the terminal 2 (namely, the destination address). Optionally, the address report may further include the address of the terminal 1 (namely, the source address). This is not specifically limited in this embodiment of this application.

Further, after receiving the address report, the session management network element 1 may request path information 1 from the service management network element. The path information 1 is used by the user plane network element 1 to route the data whose destination address is the address of the terminal 2 to a user plane network element, for example, the user plane network element 2 in the foregoing scenario, that provides access to the first local area network for the terminal 2. For example, the session management network element 1 may send a message C to the service management network element. The message C carries the indication information of the first local area network, the identifier of the user plane network element 1, and the address of the terminal 2, and is used to request path information associated with the address of the terminal 2. In this way, after receiving the message C, the service management network element may determine, based on the correspondence, stored by the service management network element when the terminal 2 accesses the first local area network, between the indication information of the first local area network, the identifier of the session management network element 2, the identifier of the user plane network element 2, and at least one of the identifier of the terminal 2 or the address of the terminal 2, that a user plane network element that provides access to the first local area network for the terminal 2 corresponding to the address of the terminal 2 is the user plane network element 2. Further, the service management network element may obtain the requested path information 1. For example, the service management network element may obtain the requested path information 1 in the following manner: When it is the first time for the user plane network element 1 to provide access to the first local area network for the terminal 1 or any other terminal, the service management network element allocates the path information 1 based on the indication information of the first local area network, the identifier of the user plane network element 2, and the identifier of the user plane network element 1. After the service management network element allocates the path information 1, optionally, the service management network element may store a correspondence between the indication information of the first local area network, an identifier of a source user plane network element (which is the user plane network element 1 herein), an identifier of a target user plane network element (which is the user plane network element 2 herein), and the path information 1. Alternatively, when it is not the first time for the user plane network element 1 to provide access to the first local area network for the terminal 1 or any other terminal, the service management network element may query, based on the identifier of the user plane network element 1, the identifier of the user plane network element 2, and the indication information of the first local area network, the stored correspondence between the indication information of the first local area network, the identifier of the source user plane network element, the identifier of the target user plane network element, and the path information, to determine the corresponding path information 1. This is not specifically limited in this embodiment of this application.

In addition, optionally, the message C may not carry the identifier of the user plane network element 1, but carry the address of the terminal 1. In this way, after receiving the message C, the service management network element further needs to determine, based on the correspondence, stored by the service management network element when the terminal 1 accesses the first local area network, between the indication information of the first local area network, the identifier of the session management network element 1, the identifier of the user plane network element 1, and at least one of the identifier of the terminal 1 or the address of the terminal 1, that a user plane network element that provides access to the first local area network for the terminal 1 corresponding to the address of the terminal 1 is the user plane network element 1. Then, the service management network element obtains the path information 1 in the foregoing manner. This is not specifically limited in this embodiment of this application.

Further, after obtaining the corresponding path information 1, the service management network element may send the path information 1 to the session management network element 1. Then, the session management network element 1 sends a routing rule 1 (namely, information related to the path information 1) to the user plane network element 1 that sends the address report, for configuring the routing rule 1 on the user plane network element 1. The routing rule 1 includes the indication information of the first local area network, the address of the terminal 2, and the path information 1. In this way, the user plane network element 1 may route, according to the routing rule 1, the received data whose destination address is the address of the terminal 2 to the user plane network element 2. Then, the user plane network element 2 routes the data to the terminal 2 through a corresponding access device. This is not specifically limited in this embodiment of this application.

Optionally, in the foregoing scenario, if the message C carries the address of the terminal 1, the service management network element may further obtain path information 2. The path information 2 is used by the user plane network element 2 to route data whose destination address is the address of the terminal 1 to a user plane network element, for example, the user plane network element 1 in the foregoing scenario, that provides access to the first local area network for the terminal 1. For a manner in which the service management network element obtains the path information 2, refer to the descriptions in the foregoing case 1. Details are not described herein again.

Further, after obtaining the path information 2, the service management network element may send a routing rule 2 and the identifier of the user plane network element 1 to the session management network element 2 that manages the user plane network element 2. Then, the session management network element 2 sends the routing rule 2 to the user plane network element 2 corresponding to the identifier of the user plane network element 2, for configuring the routing rule 2 on the user plane network element 2. The routing rule 2 includes the indication information of the first local area network, the address of the terminal 1, and the path information 2. In this way, after receiving the data whose destination address is the address of the terminal 1, the user plane network element 2 may route the data to the user plane network element 1 according to the routing rule 2. Then, the user plane network element 1 routes the data to the terminal 1 through a corresponding access device. This is not specifically limited in this embodiment of this application.

Certainly, in this embodiment of this application, the routing rule 2 may not be further configured on the user plane network element 2. Instead, an address report is configured on the user plane network element 2. When the terminal 2 sends data to the terminal 1, after the user plane network element 2 receives the data whose destination address is the address of the terminal 1, if the user plane network element 2 detects that no forwarding path information can be matched for the data whose destination address is the address of the terminal 1, the user plane network element 2 sends the address report to the session management network element 2. Then, the routing rule 2 is configured on the user plane network element 2 in a manner similar to the foregoing manner of configuring the routing rule 1 on the user plane network element 1. This is not specifically limited in this embodiment of this application.

In conclusion, according to the foregoing solution, private communication can be implemented between the terminal 1 for which the user plane network element 1 managed by the session management network element 1 provides a first local area network service, and the terminal 2 for which the user plane network element 2 managed by the session management network element 2 provides the first local area network service. In other words, private communication across session management network elements can be implemented for a local area network service.

Case 3: In a process of creating or updating a session or another process, the service management network element may provide topology management and user plane path management for the local area network. In addition, the session management network element allocates path information.

An implementation is similar to that in Case 1, and a difference between Case 3 and Case 1 is as follows.

In one aspect, when it is the first time for the user plane network element 1 to provide access to the first local area network for the terminal 1 or any other terminal, a manner of obtaining path information in a first direction in Case 3 is different from that in case 1. In case 1, when it is the first time for the user plane network element 1 to provide access to the first local area network for the terminal 1 or any other terminal, the service management network element allocates the path information in the first direction based on the indication information of the first local area network, an identifier of another user plane network element, and the identifier of the user plane network element 1. In Case 3, when it is the first time for the user plane network element 1 to provide access to the first local area network for the terminal 1 or any other terminal, the service management network element requests the path information in the first direction from the session management network element 1 that manages the user plane network element 1. For example, the service management network element obtains path information 2. In case 1, when it is the first time for the user plane network element 1 to provide access to the first local area network for the terminal 1 or any other terminal, the service management network element allocates the path information 2 based on the indication information of the first local area network, the identifier of the user plane network element 2, and the identifier of the user plane network element 1. However, in Case 3, when it is the first time for the user plane network element 1 to provide access to the first local area network for the terminal 1 or any other terminal, the service management network element requests the path information 2 from the session management network element 1 that manages the user plane network element 1. After the session management network element 1 allocates the path information 2, the session management network element 1 sends the path information 2 to the service management network element. For related implementation, refer to the following embodiment shown in FIG. 7. Details are not described herein.

In another aspect, a manner in which the service management network element obtains path information in a second direction is different from that in case 1. In case 1, when it is the first time for the user plane network element 1 to provide access to the first local area network for the terminal 1 or any other terminal, the service management network element allocates the path information in the second direction based on the indication information of the first local area network, an identifier of another user plane network element, and the identifier of the user plane network element 1, and sends the path information in the second direction to the session management network element 1 corresponding to the user plane network element 1. When it is not the first time for the user plane network element 1 to provide access to the first local area network for the terminal 1 or any other terminal, the service management network element does not need to obtain the path information in the second direction. In Case 3, the service management network element obtains the corresponding path information in the first direction, and sends an identifier of a corresponding user plane network element and information related to the path information in the first direction to a corresponding session management network element. Then, for each piece of path information in the first direction, if the session management network element determines that path information that is in the second direction and that corresponds to the path information in the first direction does not exist on the corresponding user plane network element, the session management network element allocates the corresponding path information in the second direction based on the indication information of the first local area network, the identifier of the user plane network element, and the identifier of the user plane network element 1, and then sends the path information in the second direction to the service management network element. For example, the service management network element obtains the path information 1. In case 1, when it is the first time for the user plane network element 1 to provide access to the first local area network for the terminal 1 or any other terminal, the service management network element allocates the path information 1 based on the indication information of the first local area network, the identifier of the user plane network element 2, and the identifier of the user plane network element 1; and sends the path information 1 to the session management network element 1 corresponding to the user plane network element 1. When it is not the first time for the user plane network element 1 to provide access to the first local area network for the terminal 1 or any other terminal, the service management network element does not need to obtain the path information 1. In Case 3, the service management network element determines the path information 2, and sends the identifier of the user plane network element 2 and information related to the path information 2 to the session management network element 2 that manages the user plane network element 2. Then, if the session management network element 2 determines that the path information 1 corresponding to the path information 2 does not exist on the corresponding user plane network element 2, the session management network element 2 allocates the path information 1 based on the indication information of the first local area network, the identifier of the user plane network element 2, and the identifier of the user plane network element 1, and then sends the path information 1 to the service management network element.

For other related descriptions, refer to the descriptions in case 1. Details are not described herein again.

Case 4: The service management network element does not provide user plane path management for the local area network. Instead, different session management network elements negotiate with each other for updating path information.

For example, after the service management network element receives the message B, the service management network element may determine, based on the indication information of the first local area network in the message B and with reference to a correspondence, stored by the service management network element when one or more terminals access the first local area network, between the indication information of the local area network, an identifier of the session management network element, an identifier of the user plane network element, and at least one of an identifier of the terminal or an address of the terminal, whether another user plane network element currently provides access to the first local area network for another terminal. If another user plane network element currently provides access to the first local area network for another terminal, the service management network element may return, to the session management network element 1, an identifier of the other user plane network element, an identifier of a session management network element corresponding to the other user plane network element, and the indication information of the corresponding first local area network (alternatively, the session management network element 1 uses the identifier of the first local area network as the indication information of the first local area network). Then, the session management network element 1 obtains corresponding path information in a first direction based on the indication information of the first local area network, the identifier of the other user plane network element, and the identifier of the user plane network element 1. The path information in the first direction is used by the other user plane network element to route data whose destination address is the address of the terminal 1 to the user plane network element 1. Further, the session management network element 1 may send a message D to a corresponding session management network element based on the identifier that is of the session management network element corresponding to the other user plane network element and that is sent by the service management network element. The message D includes the indication information of the first local area network, the address of the terminal 1, the corresponding path information in the first direction, and an identifier of a corresponding user plane network element. The session management network element sends, to the corresponding user plane network element based on the identifier of the corresponding user plane network element, information related to the path information in the first direction (where the information includes the indication information of the first local area network, the address of the terminal 1, and the corresponding path information in the first direction), for configuring, on the user plane network element, the information related to the path information in the first direction. For a manner in which the session management network element 1 obtains the corresponding path information in the first direction, refer to the manner in which the service management network element obtains the corresponding path information in the first direction in case 1. A difference lies in that, for example, the service management network element in case 1 is replaced by the session management network element 1 in case 4. For other related descriptions, refer to the descriptions in case 1. Details are not described herein again.

For example, with reference to the foregoing scenario, the service management network element may determine that the user plane network element 2 provides access to the first local area network for the terminal 2 and the terminal 3. In this case, the service management network element sends, to the session management network element 1, the identifier of the user plane network element 2, the identifier of the session management network element 2, and the corresponding indication information of the first local area network (alternatively, the session management network element 1 uses the identifier of the first local area network as the indication information of the first local area network). Then, the session management network element 1 obtains path information 2 based on the indication information of the first local area network, the identifier of the user plane network element 2, and the identifier of the user plane network element 1. The path information 2 is used by the user plane network element 2 to route the data whose destination address is the address of the terminal 1 to the user plane network element 1. Further, the session management network element 1 may send a routing rule 2 and the identifier of the user plane network element 2 to the session management network element 2 based on the identifier of the corresponding session management network element 2 that is sent by the service management network element. Then, the session management network element 2 sends the routing rule 2 to the corresponding user plane network element 2 based on the identifier of the user plane network element 2, for configuring the routing rule 2 on the user plane network element 2. The routing rule 2 includes the indication information of the first local area network, the address of the terminal 1, and the path information 2. In this way, after receiving the data whose destination address is the address of the terminal 1, the user plane network element 2 may route the data to the user plane network element 1 according to the routing rule 2. Then, the user plane network element 1 routes the data to the terminal 1 through a corresponding access device. This is not specifically limited in this embodiment of this application.

Further, after the other session management network element receives the message D from the session management network element 1, for each piece of path information in the first direction, if the session management network element determines that path information that is in a second direction and that corresponds to the path information in the first direction does not exist on the corresponding user plane network element, the session management network element allocates the corresponding path information in the second direction based on the indication information of the first local area network, the identifier of the user plane network element, and the identifier of the user plane network element 1, and then sends the path information in the second direction to the service management network element. The path information in the second direction is used by the user plane network element 1 to route data whose destination address is an address of the other terminal to the corresponding user plane network element. The other terminal herein is a terminal for which the corresponding user plane network element provides access to the first local area network. Further, the service management network element may send, to the session management network element 1, the identifier of the corresponding user plane network element 1 and information related to the path information in the second direction (where the information includes the indication information of the first local area network, the address of the other terminal, and the corresponding path information in the second direction). Then, the session management network element 1 sends, to the corresponding user plane network element 1 based on the identifier of the user plane network element 1, the information related to the path information in the second direction, for configuring, on the user plane network element 1, the information related to the path information in the second direction. For example, with reference to the foregoing scenario, it is assumed that after receiving the message D from the session management network element 1, the session management network element 2 determines that path information 1 corresponding to the path information 2 does not exist on the corresponding user plane network element 2. In this case, the session management network element 2 allocates the corresponding path information 1 based on the indication information of the first local area network, the identifier of the user plane network element 2, and the identifier of the user plane network element 1. The path information 1 is used by the user plane network element 1 to route data whose destination address is the address of the terminal 2 or the address of the terminal 3 to the user plane network element 2. Further, the service management network element may send a routing rule 1 and the identifier (optional) of the user plane network element 1 to the session management network element 1. Then, the session management network element 1 sends the routing rule 1 to the corresponding user plane network element 1 based on the identifier of the user plane network element 1, for configuring the routing rule 1 on the user plane network element 1. The routing rule 1 includes the indication information of the first local area network, the address of the terminal 2, the address of the terminal 3, and the path information 1. In this way, after receiving the data whose destination address is the address of the terminal 2 or the address of the terminal 3, the user plane network element 1 may route the data to the user plane network element 2 according to the routing rule 1. Then, the user plane network element 2 routes the data to the terminal 2 or the terminal 3 through a corresponding access device. This is not specifically limited in this embodiment of this application.

In conclusion, according to the foregoing solution, private communication can be implemented between the terminal 1 for which the user plane network element 1 managed by the session management network element 1 provides a first local area network service, and the terminal 2 or the terminal 3 for which the user plane network element 2 managed by the session management network element 2 provides the first local area network service. In other words, private communication across session management network elements can be implemented for a local area network service.

Optionally, the communications system shown in FIG. 1 may be applied to a current 5G network or another future network. This is not specifically limited in this embodiment of this application.

Figure 2:
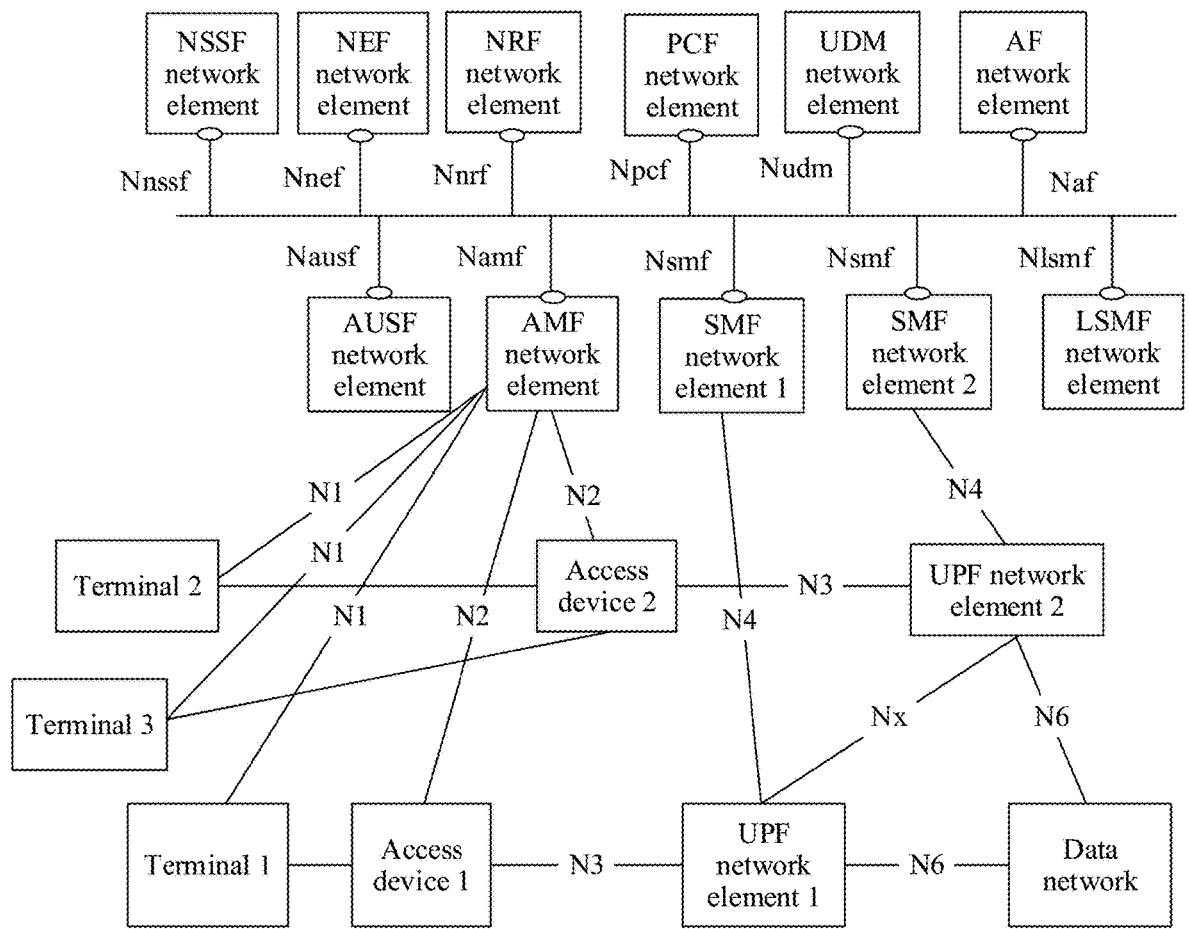
FIG. 2 is a schematic diagram of application of a communications system in a 5G network according to an embodiment of this application.

For example, as shown in FIG. 2, if the communications system shown in FIG. 1 is applied to a current 5G network, a network element or an entity corresponding to the session management network element 1 in FIG. 1 may be an SMF network element 1 in a 5G network architecture; a network element or an entity corresponding to the session management network element 2 in FIG. 1 may be an SMF network element 2 in the 5G network architecture; a network element or an entity corresponding to the user plane network element 1 in FIG. 1 may be a UPF network element 1 in the 5G network architecture; a network element or an entity corresponding to the user plane network element 2 in FIG. 1 may be a UPF network element 2 in the 5G network architecture; and a network element or an entity corresponding to the service management network element in FIG. 1 may be a 5GLAN SMF (LSMF) network element in the 5G network architecture. The foregoing local area network may be a 5GLAN. In addition, in terms of an expression, the 5GLAN may also be referred to as a LAN, a LAN-type service, a LAN-virtual network (VN), a 5G LAN-type service, a 5G LAN-VN, a 5GLAN group, a LAN group, or the like. The LSMF network element may also be referred to as a 5GLAN group management function (GMF) network element, a 5GLAN path management function (PMF) network element, a 5GLAN address resolution function (ARF) network element, a 5GLAN group controller/control function (GCF)

network element, a 5GLAN configuration controller/control function (CCF) network element, a 5GLAN configuration management function (CMF) network element, a 5GLAN-type service management function (5LSMF) network element, a 5GLAN virtual network management function (5LVMF) network element, a 5GLAN virtual network controller (5LVC), a 5GLAN controller (5LC), a 5GLAN-type service controller (5LSC), or the like. Names of the 5GLAN and the LSMF network element are not specifically limited in this embodiment of this application.

In this embodiment of this application, the LSMF network element is configured to manage a topology structure of the 5GLAN and routes between different UPF network elements in the 5GLAN. For example, the LSMF network element can dynamically add an SMF network element or a UPF network element to the 5GLAN based on a location at which a terminal accesses the 5GLAN, or dynamically update an SMF network element or a UPF network element based on movement of a terminal. Alternatively, the LSMF network element can update a route in the 5GLAN based on an address change, for example, adding a new address or deleting an old address, of a terminal in the 5GLAN, to ensure that the 5GLAN can meet 5GLAN private communication, namely, point-to-point data transmission between terminals. Alternatively, when the LSMF network element detects that an SMF network element serving a terminal is different from an SMF network element serving another terminal, the LSMF network element updates a route between corresponding UPF network elements through negotiation between two SMF network elements. If it is the first time for a UPF network element to provide a 5GLAN service for a terminal, a forwarding path between the UPF network element and another UPF network element needs to be established during updating of a route.

In addition, as shown in FIG. 2, the current 5G network may further include an access device 1, an access device 2, an access and mobility management function (AMF) network element, an authentication server function (AUSF) network element, a network slice selection function (NSSF) network element, a network exposure function (NEF) network element, a network repository function (NRF) network element, a policy control function (PCF) network element, a unified data management (UDM) network element, an application function (AF) network element, and the like. This is not specifically limited in this embodiment of this application.

As shown in FIG. 2, a terminal 1 accesses the 5G network through the access device 1, and the terminal 1 communicates with the AMF network element through a next generation (N) 1 interface (N1). A terminal 2 accesses the 5G network through the access device 2, and the terminal 2 communicates with the AMF network element through N1. A terminal 3 accesses the 5G network through the access device 2, and the terminal 3 communicates with the AMF network element through N1. The access device 1 or the access device 2 communicates with the AMF network element through an N2 interface (N2). The access device 1 communicates with the UPF network element 1 through an N3 interface (N3), and the access device 2 communicates with the UPF network element 2 through N3. The SMF network element 1 communicates with the UPF network element 1 through an N4 interface (N4), and the SMF network element 2 communicates with the UPF network element 2 through N4. The UPF network element 1 communicates with the UPF network element 2 through an Nx interface (Nx). Alternatively, the UPF network element 1 or the UPF network element 2 accesses a data network through an N6 interface (N6). The Nx interface may reuse an existing N9 interface or the existing N6 interface, or may be a new defined interface. This is not limited. In addition, control plane network elements such as the AUSF network element, the AMF network element, the SMF network element, the NSSF network element, the NEF network element, the NRF network element, the PCF network element, the UDM network element, and the AF network element shown in FIG. 2 may alternatively interact with each other through a service-based interface. For example, a service-based interface exhibited by the AUSF network element may be Nausf; a service-based interface exhibited by the AMF network element may be Namf; a service-based interface exhibited by the SMF network element may be Nsmf; a service-based interface exhibited by the NSSF network element may be Nnssf; a service-based interface exhibited by the NEF network element may be Nnef; a service-based interface exhibited by the NRF network element may be Nnrf; a service-based interface exhibited by the PCF network element may be Npcf; a service-based interface exhibited by the UDM network element may be Nudm; and a service-based interface exhibited by the AF network element may be Naf. For related descriptions, refer to a diagram of a 5G system architecture in the standard TS 23.501. Details are not described herein.

Figure 3:
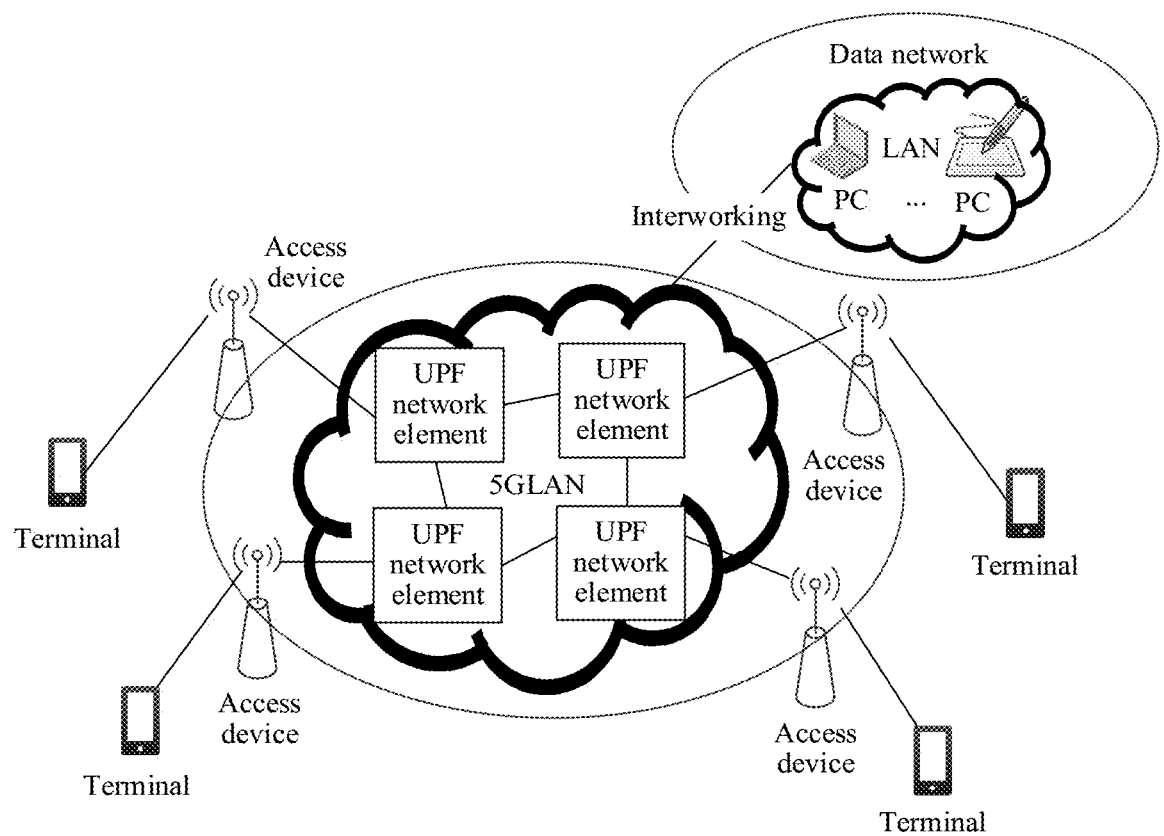
FIG. 3 is a schematic diagram of a user plane architecture of an existing 5GLAN service.

FIG. 3 is a schematic diagram of a user plane architecture of an existing 5GLAN service. A terminal establishes a session to a UPF network element that provides the 5GLAN service, to access the UPF network element that provides the 5GLAN service. As described above, the UPF network element that provides the 5GLAN service may communicate with an existing LAN in a data network through N6, for example, communicate with a personal computer (PC) in the LAN. Alternatively, the UPF network element that provides the 5GLAN service may associate sessions of different terminals through an internal connection between UPF network elements, to implement private communication. This is not specifically limited in this embodiment of this application.

Optionally, the terminal in this embodiment of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem (modem), a handheld device, a laptop computer, a cordless phone or a wireless local loop (WLL) station, a machine type communication (MTC) terminal, a user equipment (UE), a mobile station (MS), a terminal device, relay user equipment, or the like. The relay user equipment may be, for example, a 5G residential gateway (RG). For ease of description, in this application, the devices mentioned above are collectively referred to as terminals.

Optionally, an access device (including the access device 1 or the access device 2) in the embodiments of this application is a device that accesses a core network, for example, may be a base station, a broadband network gateway (BNG), an aggregation switch, or a non-3rd generation partnership project (non-3GPP) access device. The base station may include base stations in various forms, for example, a macro base station, a micro base station (also referred to as a small cell), a relay station, and an access point.

Optionally, the service management network element, the session management network element 1, or the session management network element 2 in FIG. 1 in the embodiments of this application may be implemented by one device, or may be jointly implemented by a plurality of devices, or may be a functional module in a device. This is not specifically limited in this embodiment of this application. It may be understood that the foregoing functions may be network elements in a hardware device, or may be software functions running on dedicated hardware, or may be virtualization functions instantiated on a platform (for example, a cloud platform).

Figure 4:
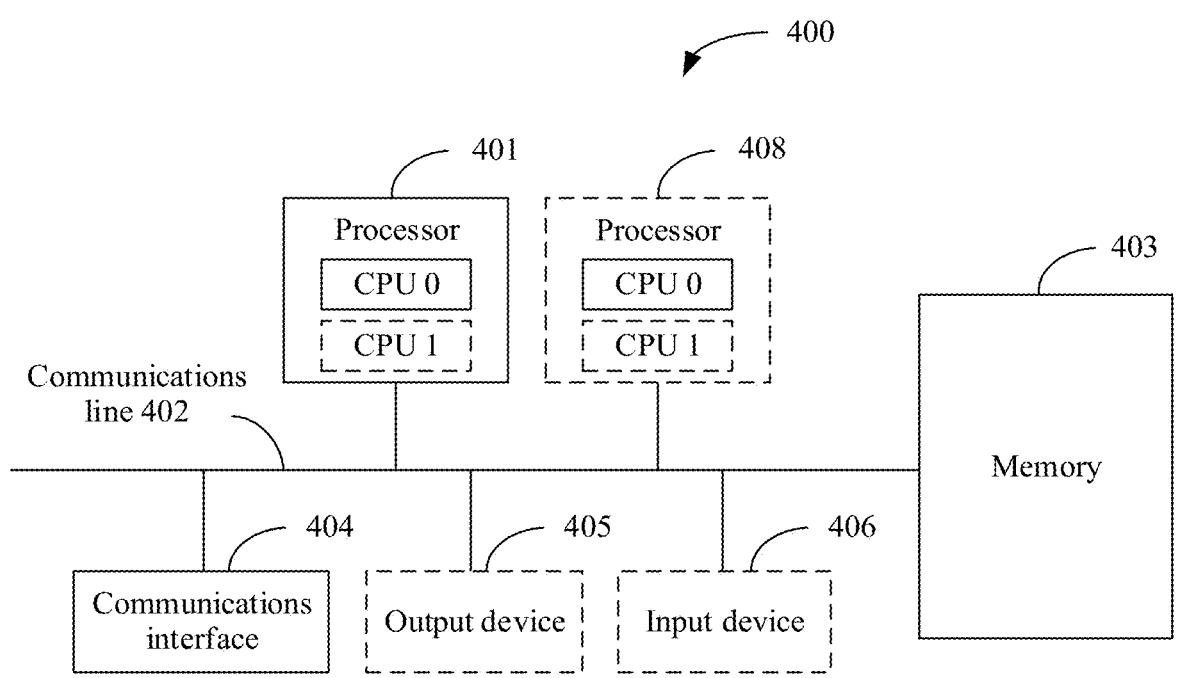
FIG. 4 is a schematic diagram of a hardware structure of a communications device according to an embodiment of this application.

For example, the service management network element, the session management network element 1, or the session management network element 2 in FIG. 1 in the embodiments of this application may be implemented by a communications device in FIG. 4. FIG. 4 is a schematic diagram of a hardware structure of a communications device 400 according to an embodiment of this application. The communications device 400 includes a processor 401, a communications line 402, a memory 403, and at least one communications interface (FIG. 4 is described using merely an example in which the communications device 400 includes a communications interface 404).

The processor 401 may be a general-purpose central processing unit (CPU), a microprocessor, an application-specific integrated circuit (ASIC), or one or more integrated circuits configured to control program execution of the solutions of this application.

The communications line 402 may include a path for transmitting information between the foregoing components.

The communications interface 404 is configured to communicate with another device or a communications network such as the Ethernet, a radio access network (RAN), or a wireless local area network (WLAN) through any apparatus such as a transceiver.

The memory 403 may be a read-only memory (ROM) or another type of static storage device that can store static information and an instruction, or a random-access memory (RAM) or another type of dynamic storage device that can store information and an instruction. Alternatively, the memory 403 may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 403 is not limited thereto. The memory may exist independently, and is connected to the processor through the communications line 402. Alternatively, the memory may be integrated with the processor.

The memory 403 is configured to store a computer-executable instruction for executing the solutions of this application, and the processor 401 controls the execution. The processor 401 is configured to execute the computer-executable instruction stored in the memory 403, to implement a local area network communication method provided in the following embodiments of this application.

Optionally, the computer-executable instruction in this embodiment of this application may also be referred to as application program code. This is not specifically limited in this embodiment of this application.

During implementation, in an embodiment, the processor 401 may include one or more CPUs, for example, a CPU 0 and a CPU 1 in FIG. 4.

During implementation, in an embodiment, the communications device 400 may include a plurality of processors, for example, the processor 401 and a processor 408 in FIG. 4. Each of the processors may be a single-core processor (single-CPU) or a multi-core processor (multi-CPU). The processor herein may refer to one or more devices, circuits, and/or processing cores configured to process data (for example, a computer program instruction).

During implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector (projector), or the like. The input device 406 communicates with the processor 401, and may receive an input of a user in a plurality of manners. For example, the input device 406 may be a mouse, a keyboard, a touchscreen device, or a sensing device.

The communications device 400 may be a general-purpose device or a dedicated device. During implementation, the communications device 400 may be a desktop computer, a portable computer, a network server, a personal digital assistant (PDA), a mobile phone, a tablet computer, a wireless terminal device, an embedded device, or a device with a structure similar to that in FIG. 4. A type of the communications device 400 is not limited in this embodiment of this application.

The following describes in detail the local area network communication method provided in the embodiments of this application with reference to FIG. 1 to FIG. 4.

It should be noted that in the following embodiments of this application, names of messages between network elements, names of parameters in messages, or the like are merely examples, and there may be other names in other implementations. This is not specifically limited in the embodiments of this application.

Figure 5:
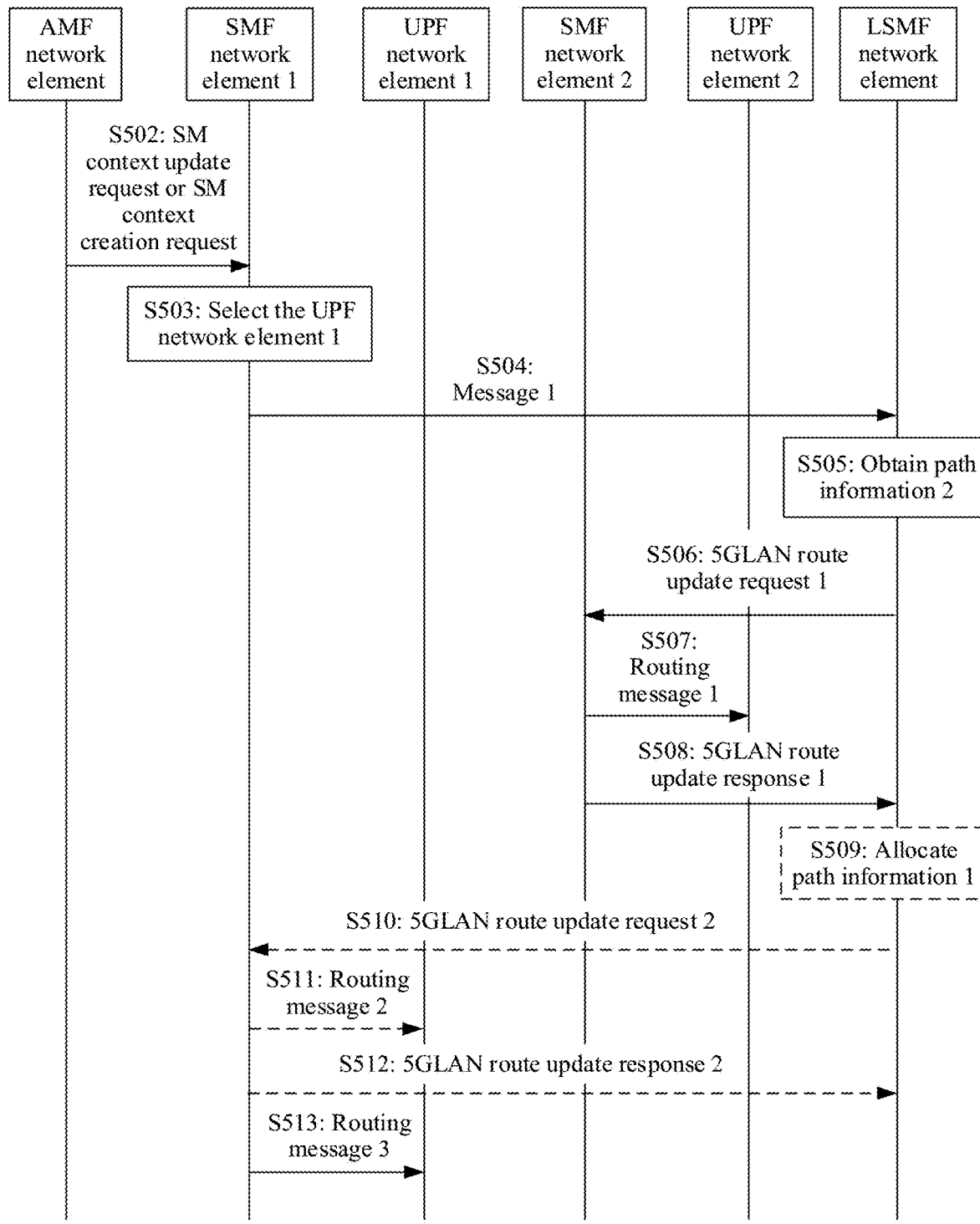
FIG. 5 is a schematic flowchart 1 of a local area network communication method according to an embodiment of this application.

First, an example in which the communications system shown in FIG. 1 is applied to the 5G network shown in FIG. 2, a session management network element 1 is an SMF network element 1, a session management network element 2 is an SMF network element 2, a user plane network element 1 is a UPF network element 1, and a user plane network element 2 is a UPF network element 2 is used for description. It is assumed that in a process of creating or updating a session or another process, an LSMF network element may provide topology management and user plane path management for a 5GLAN. In addition, the LSMF network element allocates and manages path information (which corresponds to the foregoing case 1). FIG. 5 shows a local area network communication method according to an embodiment of this application. The local area network communication method includes the following steps.

S502: An AMF network element sends a session management (SM) context update request or an SM context creation (create) request to the SMF network element 1, and the SMF network element 1 receives the SM context update request or the SM context creation request from the AMF network element.

The SM context update request or the SM context creation request includes a session identifier (session ID) and an identifier of a terminal 1.

Optionally, in this embodiment of this application, after receiving a session establishment request message from the terminal 1, the AMF network element may perform step S502. Alternatively, after receiving a session update request message from the terminal 1, the AMF network element performs step S502. Alternatively, after receiving a registration request message or a service request message from the terminal 1, the AMF network element performs step S502. Alternatively, after receiving a handover request message from a first access device, the AMF network element performs step S502. When or how to perform step S502 is not specifically limited in this embodiment of this application.

Optionally, after receiving the handover request message from the first access device, the AMF network element performs step S502. It is assumed that a corresponding scenario is that the terminal 1 is handed over from an SMF network element 3 that currently serves the terminal 1 to the SMF network element 1 that is to serve the terminal 1. In this case, the corresponding SM context update request or SM context creation request may further include an identifier of the SMF network element 3 and the session identifier. This is not specifically limited in this embodiment of this application.

Optionally, if the AMF network element performs step S502 after receiving the session establishment request message from the terminal 1, the SM context creation request sent by the AMF network element to the SMF network element 1 may include an SM message. The SM message may be, for example, the session establishment request message. This is not specifically limited in this embodiment of this application.

Alternatively, if the AMF network element performs step S502 after receiving the session update request message from the terminal 1, the SM context update request sent by the AMF network element to the SMF network element 1 may include an SM message. The SM message may be, for example, the session update request message. This is not specifically limited in this embodiment of this application.

Optionally, the SM context update request or the SM context creation request may further include a LAN ID of a session. Alternatively, the SM message may further include a LAN ID of a session. This is not specifically limited in this embodiment of this application.

In this embodiment of this application, the LAN ID may be understood as an identifier of a 5GLAN group. In other words, the LAN ID may be used to represent a 5GLAN group, a 5G LAN-VN, or a specific 5GLAN service. Terminals that use a same LAN ID belong to a same 5GLAN group, and may use a 5GLAN service corresponding to the LAN ID or may use a 5GLAN-VN corresponding to the LAN ID. In other words, local area network private communication may be performed between the terminals that use a same LAN ID. A general description is provided herein, and details are not described below again.

Optionally, in terms of a format, the LAN ID may be a special domain name (for example, a data network name (DNN)), a fully qualified domain name (FQDN), a VID, a character string, an internal group identifier, an external group identifier, a sequence number, or the like. In addition, the LAN ID may further use some special formats. For example, the LAN ID may further include provider information, operator information, network information, domain information, and the like. This is not specifically limited in this embodiment of this application.

S503: The SMF network element 1 obtains the LAN ID of the session, and selects the UPF network element 1 to serve the terminal 1.

For example, in this embodiment of this application, the SMF network element 1 may obtain the LAN ID of the session in the following manners: For example, the SMF network element 1 may obtain the LAN ID of the session from the SM context update request or the SM context creation request. Alternatively, the SMF network element 1 may obtain the LAN ID of the session from the SM message in the SM context update request or the SM context creation request. Alternatively, the SMF network element 1 may obtain, based on the session identifier in the SM context update request or the SM context creation request, the LAN ID of the session from a local UE context. Alternatively, in the handover scenario described in step S502, the SMF network element 1 may obtain the LAN ID of the session from the SMF network element 3 based on the identifier of the SMF network element 3 and the session identifier that are in the SM context update request or the SM context creation request. This is not specifically limited in this embodiment of this application.

For a manner in which the SMF network element 1 selects the UPF network element 1, refer to the conventional technology. Details are not described herein.

S504: The SMF network element 1 sends a message 1 to the LSMF network element, and the LSMF network element receives the message 1 from the SMF network element 1.

The message 1 includes the LAN ID of the session, the identifier of the terminal 1, an identifier of the SMF network element 1, and an identifier of the UPF network element 1, and is used to update information about a terminal connected to the 5GLAN.

Optionally, in this embodiment of this application, the identifier of the terminal 1 may be, for example, a subscription permanent identifier (SUPI), an international mobile subscriber identity (IMSI), a mobile subscriber integrated services digital network (MSISDN) number, a globally unique temporary identity (GUTI), an identity related to a data network (for example, a network access identifier (NM), or a user identifier specific to a local area network. This is not specifically limited in this embodiment of this application.

In this embodiment of this application, after receiving the message 1 from the SMF network element 1, the LSMF network element may determine an address of the terminal 1 corresponding to the identifier of the terminal 1. For example, the LSMF network element allocates the address of the terminal 1 using an address pool corresponding to the LAD ID. Alternatively, the LSMF network element obtains the address of the terminal 1 from a dynamic host configuration protocol (DHCP) server or a data network authentication, authorization, and accounting (DN-AAA) server. This is not specifically limited in this embodiment of this application.

Optionally, in this embodiment of this application, the address of the terminal 1 may be, for example, an Internet Protocol version 4 (IPv4) address, an Internet Protocol version 6 (Ipv6) address, a media access control (MAC) address, or a MAC address+a virtual local area network identifier (VID). This is not specifically limited in this embodiment of this application.

Optionally, in this embodiment of this application, assuming that the LAN ID of the session is a LAN ID 1, that the LSMF network element updates the information about the terminal connected to the 5GLAN may be, for example, the LSMF network element stores a correspondence between the LAN ID 1, the identifier of the SMF network element 1, the identifier of the UPF network element 1, and at least one of the identifier of the terminal 1 or the address of the terminal 1. For example, updated information about the terminal connected to the 5GLAN may be shown in Table 1 or Table 2, and includes a correspondence between the LAN ID, an identifier of an SMF network element, an identifier of a UPF network element, and at least one of an identifier of the terminal or an address of the terminal.

TABLE 1

| LAN ID | Identifier of the SMF network element | Identifier of the UPF network element | Identifier of the terminal (optional) | Address of the terminal (optional) |
|---|---|---|---|---|
| LAN ID 1 | Identifier of an SMF network element 2 | Identifier of the UPF network element 2 | Identifier of a terminal 2<br>Identifier of a terminal 3<br>... | Address of the terminal 2<br>Address of the terminal 3<br>... |
|  | Identifier of the SMF network element 1 | Identifier of the UPF network element 1 | Identifier of the terminal 1 | Address of the terminal 1 |

TABLE 2

| LAN ID | Identifier of the SMF network element | Identifier of the UPF network element | Identifier of the terminal (optional) | Address of the terminal (optional) |
|---|---|---|---|---|
| LAN ID 1 | Identifier of an SMF network element 2 | Identifier of a UPF network element 2 | Identifier of a terminal 2<br>Identifier of a terminal 3<br>... | Address of the terminal 2<br>Address of the terminal 3<br>... |
|  | Identifier of the SMF network element 1 | Identifier of the UPF network element 1 | Identifier of a terminal 4<br>...<br>Identifier of the terminal 1 | Address of the terminal 4<br>...<br>Address of the terminal 1 |
| ... | ... | ... | ... | ... |

Table 1 is described using an example in which before the terminal 1 accesses the 5GLAN corresponding to the LAN ID 1, the terminal 2 and the terminal 3 for which the UPF network element 2 provides the 5GLAN service corresponding to the LAN ID 1 have accessed the 5GLAN corresponding to the LAN ID 1. The UPF network element 2 is managed by the SMF network element 2. Table 2 is described using an example in which before the terminal 1 accesses the 5GLAN corresponding to the LAN ID 1, the terminal 2 and the terminal 3 for which the UPF network element 2 provides the 5GLAN service corresponding to the LAN ID 1 have accessed the 5GLAN corresponding to the LAN ID 1, and the terminal 4 for which the UPF network element 1 provides the 5GLAN service corresponding to the LAN ID 1 has accessed the 5GLAN corresponding to the LAN ID 1. The UPF network element 2 is managed by the SMF network element 2, and the UPF network element 1 is managed by the SMF network element 1. A general description is provided herein, and details are not described below again.

Table 1 or Table 2 merely shows two example manners of storing, on the LSMF network element, the information about the terminal connected to the 5GLAN. A manner of storing, on the LSMF network element, the information about the terminal connected to the 5GLAN is not specifically limited by this embodiment of this application.

Further, after receiving the foregoing message 1, the LSMF network element may determine, based on the LAN ID (assumed as the LAN ID 1) in the message 1, and with reference to a correspondence (as shown in Table 1 or Table 2), stored by the LSMF network element when one or more terminals access the 5GLAN, between an identifier of the local area network, the identifier of the SMF network element, the identifier of the UPF network element, and at least one of the identifier of the terminal or the address of the terminal, whether another UPF network element currently provides, for another terminal, the 5GLAN service corresponding to the LAN ID 1. For example, in Table 1, the LSMF network element may determine that the UPF network element 2 currently provides, for the terminal 2 and the terminal 3, the 5GLAN service corresponding to the LAN ID 1. Further, for the UPF network element 2, the local area network communication method provided in this embodiment of this application further includes the following steps S505 to S512.

S505: The LSMF network element obtains, based on the LAN ID 1, the identifier of the UPF network element 1, and the identifier of the UPF network element 2, path information 2 associated with the address of the terminal 1. The path information 2 is used by the UPF network element 2 to route data whose destination address is the address of the terminal 1 to the UPF network element 1.

For example, it is assumed that the LSMF network element queries, based on the LAN ID 1, the information (as shown in Table 1) that is about the terminal connected to the 5GLAN and that is on the LSMF network element, and determines it is the first time for the UPF network element 1 to provide, for the terminal 1 or any other terminal, the 5GLAN service corresponding to the LAN ID 1. In this case, the LSMF network element may allocate, based on the LAN ID 1, the identifier of the UPF network element 2, and the identifier of the UPF network element 1, the path information 2 associated with the address of the terminal 1.

Optionally, in this embodiment of this application, after allocating the path information 2, the LSMF network element may store the LAN ID 1, the identifier of the UPF network element 2, the identifier of the UPF network element 1, and the corresponding path information 2 on the LSMF network element, as shown in Table 3.

TABLE 3

| LAN ID | Identifier of a source UPF network element | Identifier of a target UPF network element | Path information |
|---|---|---|---|
| LAN ID 1 | Identifier of the UPF network element 2 | Identifier of the UPF network element 1 | Path information 2 |
| ... | ... | ... | ... |

Alternatively, for example, it is assumed that the LSMF network element queries, based on the LAN ID 1, the information (as shown in Table 2) that is about the terminal connected to the 5GLAN and that is on the LSMF network element, and determines that it is not the first time for the UPF network element 1 to provide, for the terminal 1 or any other terminal, the 5GLAN service corresponding to the LAN ID 1. In this case, the LSMF network element may determine, based on the LAN ID 1, the identifier of the UPF network element 2, and the identifier of the UPF network element 1, and with reference to correspondences shown in Table 4, the path information 2 associated with the address of the terminal 1. This is not specifically limited in this embodiment of this application.

virtual local area network identifier (VID), or MAC+a VID. Alternatively, for example, when the path is constructed in a manner of the VXLAN, the path information may be a UPF ID, a UPF ID+a VID, an IP address+a VID, or an IP address+a port number+a VID. Alternatively, for example, when the path is constructed in a manner of the GTP-U, the path information may be a UPF ID, a UPF ID+a tunnel endpoint identifier (TEID), an IP address+a TEID, or an IP address+a port+a TEID. Alternatively, for example, when the path is constructed in a manner of the GRE, the path information may be a UPF ID, a UPF ID+a key, an IP address+a key, or an IP address+a port+a key. Alternatively, when the path is constructed in a manner of the IP tunnel, the path information may be a UPF ID, an IP address, or an IP

TABLE 4

| LAN ID | Identifier of a source UPF network element | Identifier of a target UPF network element | Path information |
|---|---|---|---|
| LAN ID 1 | Identifier of the UPF network element 2 | Identifier of the UPF network element 1 | Path information 2 |
|  | ... | ... | ... |
|  | Identifier of the UPF network element 1 | Identifier of the UPF network element 2 | Path information 1 |
|  | ... | ... | ... |
| ... | ... | ... | ... |

It should be noted that the correspondence in Table 4 between the LAN ID 1, the identifier of the UPF network element 2, the identifier of the UPF network element 1, and the corresponding path information 2 is established in the establishment manner in Table 3 when it is the first time for the UPF network element 1 to provide, for the terminal 1 or any other terminal, the 5GLAN service corresponding to the LAN ID 1. The correspondence in Table 4 between the LAN ID 1, the identifier of the UPF network element 1, the identifier of the UPF network element 2, and the corresponding path information 1 is established in the following step S509 when it is the first time for the UPF network element 1 to provide, for the terminal 1 or any other terminal, the 5GLAN service corresponding to the LAN ID 1. A general description is provided herein, and details are not described below again.

Optionally, a path (including a path corresponding to the path information 2 or a path corresponding to the path information 1 in step S505) in this embodiment of this application may be constructed in a manner of a virtual local area network (VLAN), a virtual extensible local area network (VxLAN), a general packet radio service (GPRS) tunneling protocol-user plane (GTP-U), a generic routing encapsulation (GRE) protocol, or an IP tunnel manner. The foregoing construction manner may be dynamic, or may be preconfigured in a network. This is not specifically limited in this embodiment of this application. Corresponding path information varies between different construction manners. For example, when the path is constructed in a manner of the VLAN, the path information may be a UPF ID, a UPF ID+a address+port. If the path information includes the UPF ID, the UPF ID may be a MAC address or an IP address, or an IP address+a port. Alternatively, the SMF network element or the UPF network element may determine a corresponding MAC address or IP address, or an IP address+a port based on the UPF ID. A general description is provided herein, and details are not described below again.

It should be noted that in this embodiment of this application, path information corresponding to a path from the source UPF network element to the target UPF network element and path information corresponding to a path from the target UPF network element to the source UPF network element are mutually corresponding path information. For example, the path information 2 and the path information 1 in Table 4 are mutually corresponding path information. In some technologies, for example, in the VLAN and the VxLAN, mutually corresponding path information shares a VID. Alternatively, in the GRE, mutually corresponding path information shares a GRE key. This is not specifically limited in this embodiment of this application.

S506: The LSMF network element sends a 5GLAN route update request 1 to the SMF network element 2 corresponding to the UPF network element 2, and the SMF network element 2 receives the 5GLAN route update request 1 from the LSMF network element.

The 5GLAN route update request 1 includes the indication information of the LAN, the address of the terminal 1, the identifier of the UPF network element 2, and the corresponding path information 2.

Optionally, in this embodiment of this application, the indication information of the LAN may be, for example, a LAN ID or a LAN label. This is not specifically limited in this embodiment of this application. If the indication information of the LAN is a LAN label, the LAN label may be determined based on the LAN ID. For details, refer to an existing implementation. Details are not described herein again.

For example, in this embodiment of this application, the LAN label may be, for example, a network instance identifier, a VID, or a LAN ID. This is not specifically limited in this embodiment of this application. The LAN label may be used to represent an instance of the LAN or a virtual network of the LAN, or may be used to identify, encapsulate, or represent data of the LAN. The LAN label may exist in tunnel information, terminal data, or configuration data, and is mainly used to differentiate communication of different LANs.

sent to the terminal 1. Then, the UPF network element 1 sends the data to the terminal 1 through a corresponding access device. This is not specifically limited in this embodiment of this application.

Optionally, in this embodiment of this application, after the UPF network element 2 configures the routing rule 2 on the UPF network element 2, a manner of storing the routing information on the UPF network element 2 may be shown in Table 5 or Table 6, that is, the routing information includes the indication information of the LAN, the path information, and an address of a corresponding terminal. Optionally, the path information may include the identifier of the target UPF network element. This is not specifically limited in this embodiment of this application.

TABLE 5

| Indication information of the LAN | Identifier of the target UPF network element (Optional) | Path information | Address of the terminal |
|---|---|---|---|
| LAN ID 1 | Identifier of the UPF network element 1 | Path information 2 | Address of the terminal 1 |
| ... | ... | ... | ... |

TABLE 6

| Indication information of the LAN | Identifier of the target UPF network element (Optional) | Path information | Address of the terminal |
|---|---|---|---|
| LAN ID 1 | Identifier of the UPF network element 1 | Path information 2 | Address of the terminal 4<br>Address of the terminal 1<br>... |
| ... | ... | ... | ... |

Optionally, in this embodiment of this application, if the LAN ID is used to represent a 5GLAN group, the LAN label may be a LAN label of a 5GLAN service (an instance or a virtual network) corresponding to the 5GLAN group. A general description is provided herein, and details are not described below again.

Optionally, in this embodiment of this application, after determining the LAN label based on the LAN ID, the LSMF network element may add a correspondence between the LAN ID and the LAN label to the foregoing Table 1 to Table 4 or the following tables, or replace the LAN ID by the LAN label. This is not specifically limited in this embodiment of this application.

S507: The SMF network element 2 sends a routing message 1 to the UPF network element 2 corresponding to the identifier of the UPF network element 2, and the UPF network element 2 receives the routing message 1 from the SMF network element 2.

The routing message 1 includes a routing rule 2, and is used to configure the routing rule 2 on the UPF network element 2. The routing rule 2 includes the indication information of the LAN, the address of the terminal 1, and the path information 2.

In this way, after the UPF network element 2 receives the data whose destination address is the address of the terminal 1, the UPF network element 2 may send, to the UPF network element 1 according to the routing rule 2, the data that is on the 5GLAN corresponding to the LAN ID and that is to be For example, Table 5 is described using an example in which it is the first time for the UPF network element 1 to provide, for the terminal 1 or any other terminal, the 5GLAN service corresponding to the LAN ID 1. Table 6 is described using an example in which before the terminal 1 accesses the 5GLAN corresponding to the LAN ID 1, the terminal 4 for which the UPF network element 1 provided the 5GLAN service corresponding to the LAN ID 1 has accessed the 5GLAN corresponding to the LAN ID 1 (as shown in Table 2). A general description is provided herein, and details are not described below again.

S508: The SMF network element 2 sends a 5GLAN route update response 1 to the LSMF network element, and the LSMF network element receives the 5GLAN route update response 1 from the SMF network element 2.

Optionally, in this embodiment of this application, it is assumed that the LSMF network element queries, based on the LAN ID 1, the information (as shown in Table 1) that is about the terminal connected to the 5GLAN and that is on the LSMF network element, and determines it is the first time for the UPF network element 1 to provide, for the terminal 1 or any other terminal, the 5GLAN service corresponding to the LAN ID 1. In addition, it is assumed that, as shown in Table 1 or Table 2, before the terminal 1 accesses the 5GLAN corresponding to the LAN ID 1, the terminal 2 and the terminal 3 for which the UPF network element 2 provides the 5GLAN service corresponding to the LAN ID 1 have accessed the 5GLAN corresponding to the LAN ID 1. In the foregoing cases, the local area network communication method provided in this embodiment of this application may further include the following steps S509 to S512.

S509: The LSMF network element allocates the path information 1 based on the LAN ID 1, the identifier of the UPF network element 1, and the identifier of the UPF network element 2. The path information 1 is used by the UPF network element 1 to route data whose destination address is the address of the terminal 2 and the address of the terminal 3 to the UPF network element 2.

Optionally, in this embodiment of this application, after allocating the path information 1, the LSMF network element may store the LAN ID 1, the identifier of the UPF network element 1, the identifier of the UPF network element 2, and the corresponding path information 1 on the LSMF network element. Details are shown in Table 4 and are not described herein again.

S510: The LSMF network element sends a 5GLAN route update request 2 to the SMF network element 1, and the SMF network element 1 receives the 5GLAN route update request 2 from the LSMF network element.

The 5GLAN route update request 2 includes the indication information of the LAN, the address of the terminal 1, the address of the terminal 2, the address of the terminal 3, and the corresponding path information 1.

Optionally, the 5GLAN route update request 2 in this embodiment of this application may further include the identifier of the UPF network element 1 that is used to determine the corresponding UPF network element 1. Certainly, if the 5GLAN route update request 2 does not include the identifier of the UPF network element 1, the SMF network element 1 may further determine the UPF network element 1 selected in step S503 as the UPF network element 1 corresponding to the SMF network element 1. This is not specifically limited in this embodiment of this application.

S511: The SMF network element 1 sends a routing message 2 to the corresponding UPF network element 1, and the UPF network element 1 receives the routing message 2 from the SMF network element 1.

The routing message 2 includes a routing rule 1, and is used to configure the routing rule 1 on the UPF network element 1. The routing rule 1 includes the indication information of the local area network, the address of the terminal 2, the address of the terminal 3, and the corresponding path information 1.

In this way, after the UPF network element 1 receives the data whose destination address is the address of the terminal 2 or the address of the terminal 3, the UPF network element 1 may send, to the UPF network element 2 according to the routing rule 1, the data that is on the 5GLAN corresponding to the LAN ID and that is to be sent to the terminal 2 or the terminal 3. Then, the UPF network element 2 sends the data to the terminal 2 or the terminal 3 through a corresponding access device. This is not specifically limited in this embodiment of this application.

Optionally, in this embodiment of this application, after the UPF network element 1 configures the routing rule 1 on the UPF network element 1, a manner of storing the routing information on the UPF network element 1 may be shown in Table 7, that is, the routing information includes the indication information of the LAN, the path information, and an address of a corresponding terminal. Optionally, the path information may include the identifier of the target UPF network element. This is not specifically limited in this embodiment of this application.

TABLE 7

| Indication information of the LAN | Identifier of the target UPF network element (Optional) | Path information | Address of the terminal |
| --- | --- | --- | --- |
| LAN ID 1 | Identifier of the UPF network element 2 | Path information 1 | Address of the terminal 2<br>Address of the terminal 3 |
| . . . | . . . | . . . | . . . |
| . . . | . . . | . . . | . . . |

S512: The SMF network element 1 sends a 5GLAN route update response 2 to the LSMF network element, and the LSMF network element receives the 5GLAN route update response 2 from the SMF network element 1.

It should be noted that, the foregoing steps S505 to S512 are described using merely an example in which after the LSMF network element receives the foregoing message 1, the LSMF network element determines, based on the LAN ID (assuming as the LAN ID 1) in the message 1 and with reference to the correspondence (as shown in Table 1 or Table 2), stored by the LSMF network element when one or more terminals access the 5GLAN, between the identifier of the local area network, the identifier of the SMF network element, the identifier of the UPF network elements, and at least one of the identifier of the terminal or the address of the terminal, that the UPF network element 2 currently provides, for the terminal 2 and the terminal 3, the 5GLAN service corresponding to the LAN ID 1. Certainly, if another UPF network element provides, for another terminal, the 5GLAN service corresponding to the LAN ID 1, for a corresponding local area network communication method for the UPF network element, refer to the foregoing steps S505 to S512. The difference lies only in that the UPF network element 2 in the foregoing steps S505 to S512 needs to be replaced by the UPF network element, the SMF network element 2 in the foregoing steps S505 to S512 needs to be replaced by an SMF network element corresponding to the UPF network element, and the terminal 2 and the terminal 3 in the foregoing steps S505 to S512 need to be replaced by a terminal for which the UPF network element provides access to the local area network. For other related descriptions, refer to the foregoing steps S505 to S512. Details are not described herein again.

Further, after the SMF network element 1 obtains the address of the terminal 1, the local area network communication method provided in this embodiment of this application further includes the following step S513.

S513: The SMF network element 1 sends a routing message 3 to the corresponding UPF network element 1, and the UPF network element 1 receives the routing message 3 from the SMF network element 1.

The routing message 3 includes the indication information of the LAN, the address of the terminal 1, and path information 3, and is used to configure, on the UPF network element 1, a correspondence between the indication information of the LAN, the address of the terminal 1, and the path information 3. The path information 3 is used by the UPF network element 1 to route the data whose destination address is the address of the terminal 1 to an access device corresponding to the terminal 1. Then, the access device routes the data to the terminal 1.

In this way, after the UPF network element 1 receives the data whose destination address is the address of the terminal 1, the UPF network element 1 routes, based on the indication information of the LAN, the address of the terminal 1, and the corresponding path information 3 that are stored on the UPF network element 1, the data whose destination address is the address of the terminal 1 to the access device corresponding to the terminal 1. Then, the access device routes the data to the terminal 1.

Optionally, in this embodiment of this application, the path information 3 may be, for example, tunnel information, such as an IP address or a tunnel endpoint identifier, of an access device on a GTP-U tunnel from the UPF network element 1 to the corresponding access device. This is not specifically limited in this embodiment of this application.

Optionally, in this embodiment of this application, it is assumed that the LSMF network element queries, based on the LAN ID 1, the information (as shown in Table 2) that is about the terminal connected to the 5GLAN and that is on the LSMF network element, and determines that it is not the first time for the UPF network element 1 to provide, for the terminal 1 or any other terminal, the 5GLAN service corresponding to the LAN ID 1. In this case, the foregoing steps S509 to S512 may not be performed. Instead, the LSMF network element sends the address of the terminal 1 to the SMF network element 1, and the SMF network element 1 may perform step S513 after receiving the address of the terminal 1 from the LSMF network element. This is not specifically limited in this embodiment of this application.

Alternatively, optionally, in this embodiment of this application, the SMF network element 1 may determine the address of the terminal 1. In this way, the message 1 in step S504 may include the address of the terminal 1. The message 1 optionally includes the identifier of the terminal 1. Further, it is assumed that the LSMF network element queries, based on the LAN ID 1, the information (as shown in Table 1) that is about the terminal connected to the 5GLAN and that is on the LSMF network element, and determines it is the first time for the UPF network element 1 to provide, for the terminal 1 or any other terminal, the 5GLAN service corresponding to the LAN ID 1. In this case, the 5GLAN route update request 2 in step S510 may not include the address of the terminal 1. If the LSMF network element queries, based on the LAN ID 1, the information (as shown in Table 2) that is about the terminal connected to the 5GLAN and that is on the LSMF network element, and determines that it is not the first time for the UPF network element 1 to provide, for the terminal 1 or any other terminal, the 5GLAN service corresponding to the LAN ID 1. In this case, the LSMF network element does not need to send the address of the terminal 1 to the SMF network element 1. In other words, the SMF network element 1 performs step S513 after determining the address of the terminal 1. This is not specifically limited in this embodiment of this application.

For example, the SMF network element 1 may determine the address of the terminal 1 in the following manners: The SMF network element 1 may obtain the address of the terminal 1 from a local context based on the identifier of the terminal 1. Alternatively, the SMF network element 1 may allocate the address of the terminal 1 using a local address pool. Alternatively, the SMF network element 1 may obtain the address of the terminal 1 from a DHCP server. Alternatively, the SMF network element 1 may obtain the address of the terminal 1 from subscription data returned by a UDM network element. Alternatively, the SMF network element 1 may obtain the address of the terminal 1 from a report of the UPF network element 1. Alternatively, the SMF network element 1 may obtain the address of the terminal 1 from an authentication response returned by the DN-AAA server. Alternatively, in a handover scenario (for example, the handover scenario described in step S502), the SMF network element 1 may obtain the address of the terminal 1 from the SMF network element 3 based on the identifier of the SMF network element 3 and the session identifier that are in the SM context update request or the SM context creation request. A manner in which the SMF network element 1 obtains the address of the terminal 1 is not specifically limited in this embodiment of this application.

In conclusion, according to the local area network communication method provided in this embodiment of this application, private communication can be implemented between the terminal 1 for which the UPF network element 1 managed by the SMF network element 1 provides the 5GLAN service corresponding to the LAN ID 1, and the terminal 2 or the terminal 3 for which the UPF network element 2 managed by the SMF network element 2 provides the 5GLAN service corresponding to the LAN ID 1. In other words, private communication across SMF network elements can be implemented for a local area network service.

Actions of the LSMF network element or actions of the SMF network element 2 in steps S502 to S513 may be performed by the processor 401 in the communications device 400 shown in FIG. 4 by invoking the application program code stored in the memory 403. This is not limited in this embodiment.

Figure 6:
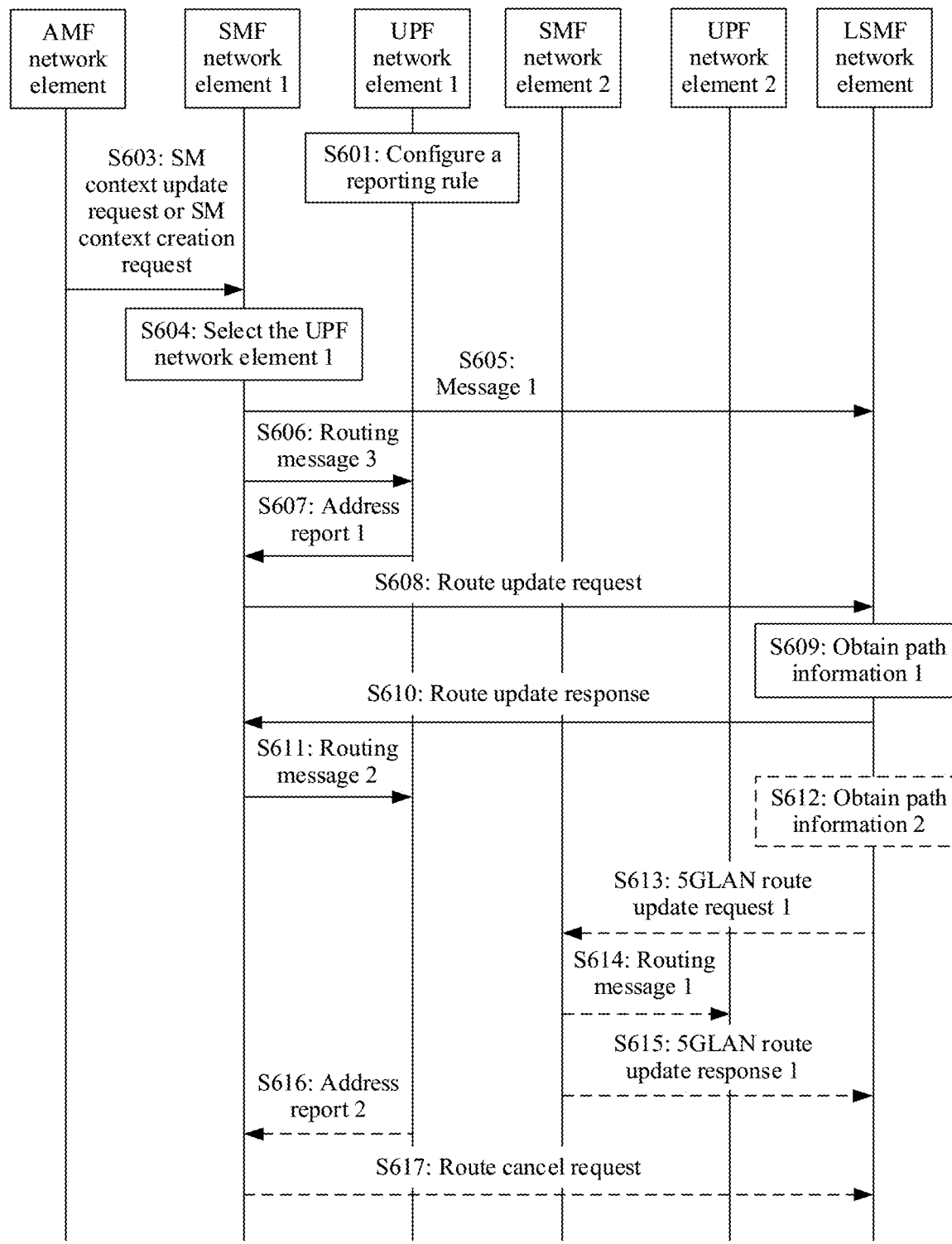
FIG. 6 is a schematic flowchart 2 of a local area network communication method according to an embodiment of this application.

Optionally, an example in which the communications system shown in FIG. 1 is applied to the 5G network shown in FIG. 2, a session management network element 1 is an SMF network element 1, a session management network element 2 is an SMF network element 2, a user plane network element 1 is a UPF network element 1, and a user plane network element 2 is a UPF network element 2 is used for description. It is assumed that in a process of creating or updating a session or another process, an LSMF network element does not update path information in a 5GLAN. Instead, for example, after completing session processing, an SMF network element obtains, as required based on an address report configured on the UPF network element, a destination address of a data packet that cannot be processed; requests, from the LSMF network element, path information associated with the destination address; and updates the path information on a UPF network element in real time (which corresponds to the foregoing Case 2). FIG. 6 shows a local area network communication method according to an embodiment of this application. The local area network communication method includes the following steps.

S601: The UPF network element 1 configures a reporting rule. The reporting rule is as follows: If the UPF network element 1 fails to match data with forwarding path information, the UPF network element 1 sends an address report to the corresponding SMF network element 1.

Optionally, in this embodiment of this application, the reporting rule may alternatively be as follows: If the UPF network element 1 detects no data associated with an address within a preset time, the UPF network element 1 sends an address report to a corresponding SMF network element 1. For example, the preset time herein may be a value of an inactive timer.

Optionally, the reporting rule in this embodiment of this application may be configured by the SMF network element 1, or may be locally configured by the UPF network element 1. This is not specifically limited in this embodiment of this application.

S603: Same as step S502 in the embodiment shown in FIG. 5. For related descriptions, refer to the embodiment shown in FIG. 5. Details are not described herein again.

S604: Similar to step S503 in the embodiment shown in FIG. 5. A difference lies, for example, in that: in this embodiment of this application, the SMF network element 1 determines an address of a terminal 1. For a manner in which the SMF network element 1 determines the address of the terminal 1, refer to the descriptions in the embodiment shown in FIG. 5. Details are not described herein again.

S605: Similar to step S504 in the embodiment shown in FIG. 5. A difference lies, for example, in that: an identifier of the terminal 1 in a message 1 is replaced by the address of the terminal 1 in this embodiment of this application, and optionally, the identifier of the terminal 1 is included. For other related descriptions, refer to the embodiment shown in FIG. 5. Details are not described herein again.

S606: Same as step S513 in the embodiment shown in FIG. 5. For related descriptions, refer to the embodiment shown in FIG. 5. Details are not described herein again.

Further, assuming that the terminal 1 in FIG. 1 sends data to a terminal 2, after the user plane network element 1 receives data whose destination address is an address of the terminal 2, the local area network communication method provided in this embodiment of this application may further include the following steps S607 to S611.

S607: If the UPF network element 1 detects that no forwarding path information can be matched for the data whose destination address is address of the terminal 2, the UPF network element 1 sends an address report 1 to the corresponding SMF network element 1. The address report 1 includes indication information of a LAN and the address of the terminal 2 (the destination address).

Optionally, the address report 1 further includes the address of the terminal 1 (a source address), and the address of the terminal 1 is a source address corresponding to data for which no path information can be matched by the UPF network element 1.

For related descriptions of the indication information of the LAN, refer to the embodiment shown in FIG. 6. Details are not described herein again.

S608: The SMF network element 1 sends a route update request to the LSMF network element, and the LSMF network element receives the route update request from the SMF network element 1.

The route update request includes the indication information of the LAN, indication information of the UPF network element 1, and the address of the terminal 2 (the destination address), and is used to request path information 1 associated with the address of the terminal 2. The path information 1 is used by the UPF network element 1 to route the data whose destination address is the address of the terminal 2 to the UPF network element 2.

Optionally, in this embodiment of this application, the indication information of the UPF network element 1 may be, for example, the address of the terminal 1 (the source address) or an identifier of the UPF network element 1. This is not specifically limited in this embodiment of this application. When the indication information of the UPF network element 1 is the address of the terminal 1, the LSMF network element may determine the identifier of the corresponding UPF network element 1 based on the indication information of the LAN and the address of the terminal 1 and with reference to the correspondences in Table 1 or Table 2. This is not specifically limited in this embodiment of this application.

In addition, after receiving the route update request, the LSMF network element may determine an identifier of the corresponding UPF network element 2 based on the indication information of the LAN and the address of the terminal 2 that are in the route update request and with reference to the correspondences in Table 1 or Table 2. This is not specifically limited in this embodiment of this application.

S609: The LSMF network element obtains, based on a LAN ID 1, the identifier of the UPF network element 1, and the identifier of the UPF network element 2, the path information 1 associated with the address of the terminal 2. The path information 1 is used by the UPF network element 1 to route the data whose destination address is the address of the terminal 2 to the UPF network element 2.

In this embodiment of this application, a manner in which the LSMF network element obtains the path information 1 associated with the address of the terminal 2 is similar to a manner in which the LSMF network element obtains path information 2 associated with the address of the terminal 1 in the embodiment shown in FIG. 5. A difference lies, for example, in the following: the path information 2 associated with the address of the terminal 1 in the embodiment shown in FIG. 5 is replaced by the path information 1 associated with the address of the terminal 2 in this embodiment of this application; the UPF network element 1 in the embodiment shown in FIG. 5 is replaced by the UPF network element 2 in this embodiment of this application; and the UPF network element 2 in the embodiment shown in FIG. 5 is replaced by the UPF network element 1 in this embodiment of this application. For other related descriptions, refer to the embodiment shown in FIG. 5. Details are not described herein again.

S610: The LSMF network element sends a route update response to the SMF network element 1, and the SMF network element 1 receives the route update response from the LSMF network element.

The route update response includes the path information 1 associated with the address of the terminal 2.

S611: The SMF network element 1 sends a routing message 2 to the corresponding UPF network element 1, and the UPF network element 1 receives the routing message 2 from the SMF network element 1.

The routing message 2 includes a routing rule 3, and is used to configure the routing rule 3 on the UPF network element 1. The routing rule 3 includes the indication information of the LAN, the address of the terminal 2, and the corresponding path information 1.

In this way, after the UPF network element 1 receives the data whose destination address is the address of the terminal 2, the UPF network element 1 may send, to the UPF network element 2 according to the routing rule 3, the data that is on the 5GLAN corresponding to the LAN ID and that is to be sent to the terminal 2. Then, the UPF network element 2 sends the data to the terminal 2 through a corresponding access device. This is not specifically limited in this embodiment of this application.

Optionally, in this embodiment of this application, after the UPF network element 1 configures the routing rule 3 on the UPF network element 1, a manner of storing the routing information on the UPF network element 1 may be shown in Table 8, that is, the routing information includes the indication information of the LAN, the path information, and an address of a corresponding terminal. Optionally, the path information may include an identifier of a target UPF network element. This is not specifically limited in this embodiment of this application.

TABLE 8

| Indication information of the LAN | Identifier of the target UPF network element (Optional) | Path information | Address of the terminal |
|---|---|---|---|
| LAN ID 1 | Identifier of the UPF network element 2 | Path information 1 | Address of the terminal 2 |
| ... | ... | ... | ... |

This embodiment of this application is described using an example in which a UPF network element that provides, for the terminal 2, a 5GLAN service corresponding to the LAN ID 1 is the UPF network element 2, and the UPF network element 2 is managed by the SMF network element 2. Optionally, it is assumed that the terminal 2 moves, a UPF network element that provides, for the terminal 2, the 5GLAN service corresponding to the LAN ID 1 is a UPF network element 3, and the UPF network element 3 is managed by an SMF network element 3 (the SMF network element 3 may be the same as or different from the SMF network element 2). In this case, the SMF network element 3 may send a message 2 to the LSMF network element, and the LSMF network element receives the message 2 from the SMF network element 3. The message 2 is similar to the message 1 in step S605 in the embodiment shown in FIG. 6, and a difference lies in that the identifier of the SMF network element 1 and the identifier of the UPF network element 1 are respectively replaced by an identifier of the SMF network element 3 and an identifier of the UPF network element 3. For other related descriptions, refer to the descriptions of the message 1 in step S605. Details are not described herein again. Further, after receiving the message 2 from the SMF network element 3, the LSMF network element may update, in a manner shown in Table 1 or Table 2 in the embodiment shown in FIG. 5, information about a terminal connected to the 5GLAN. In addition, the LSMF network element updates the path information 1 associated with the address of the terminal 2 to path information 5 associated with the address of the terminal 2, and sends a message 3 to the SMF network element 1 for updating the routing rule 3 configured on the UPF network element 1 to a routing rule 4. The routing rule 4 includes the indication information of the LAN, the address of the terminal 2, and the corresponding path information 5. This is not specifically limited in this embodiment of this application. The path information 5 is used by the UPF network element 1 to route the data whose destination address is the address of the terminal 2 to the UPF network element 3.

Optionally, if the indication information of the UPF network element 1 included in the route update request in step S608 is the address of the terminal 1 (the source address), the local area network communication method provided in this embodiment of this application may further include the following steps S612 to S614.

S612 to S615: Same as steps S505 to S508 in the embodiment shown in FIG. 5. For related descriptions, refer to the embodiment shown in FIG. 5. Details are not described herein again.

Certainly, in this embodiment of this application, steps S612 to S615 may not be performed. Instead, an address report is configured on the UPF network element 2. When the terminal 2 sends data to the terminal 1, after the UPF network element 2 receives data whose destination address is the address of the terminal 1, if the UPF network element 2 detects that no forwarding path information can be matched for the data whose destination address is the address of the terminal 1, the user plane network element 2 sends the address report to the SMF network element 2. Then, the routing rule 1 is configured on the user plane network element 2 in a manner similar to the foregoing manner of configuring the routing rule 3 on the UPF network element 1. This is not specifically limited in this embodiment of this application.

Optionally, in this embodiment of this application, if the reporting rule in step S601 may alternatively be that: if the UPF network element 1 detects no data associated with an address within a preset time, the UPF network element 1 sends an address report to the corresponding SMF network element 1, the local area network communication method provided in this embodiment of this application may further include the following steps S616 and S617.

S616: If the UPF network element 1 detects, within the preset time, no data (whose destination address is the address of the terminal 2) associated with the address of the terminal 2, the UPF network element 1 sends an address report 2 to the corresponding SMF network element 1, and the SMF network element 1 receives the address report 2 from the UPF network element 1. The address report 2 includes the indication information of the LAN and the address of the terminal 2.

For example, assuming that after the inactive timer expires, the UPF network element 1 still detects no related data whose destination address is the address of the terminal 2, the UPF network element 1 sends the address report 2 to the corresponding SMF network element 1.

Optionally, in this embodiment of this application, if the UPF network element 1 detects, within the preset time, no data (whose destination address is the address of the terminal 2) associated with the address of the terminal 2, the UPF network element 1 may alternatively locally delete the address of the terminal 2 or routing information, for example, the foregoing path information 1, associated with the address of the terminal 2. This is not specifically limited in this embodiment of this application.

S617: The SMF network element 1 sends a route cancel request to the LSMF network element, and the LSMF network element receives the route cancel request from the SMF network element 1.

The route cancel request includes the indication information of the LAN, the identifier of the UPF network element 1, and the address of the terminal 2, and is used to request to cancel updating of path information associated with the indication information of the LAN, the address of the terminal 2, and the identifier of the UPF network element 1.

In this way, the LSMF network element may stop sending, to the SMF network element 1, the path information associated with the indication information of the LAN, the address of the terminal 2, and the identifier of the UPF network element 1. This is not specifically limited in this embodiment of this application. For example, in the scenario described in step S611, even if the terminal 2 moves, a UPF network element that provides, for the terminal 2, the 5GLAN service corresponding to the LAN ID 1 is the UPF network element 3, and the UPF network element 3 is managed by the SMF network element 3 (the SMF network element 3 may be the same as or different from the SMF network element 2), the LSMF network element does not need to update the path information 1 associated with the address of the terminal 2 to the path information 5 associated with the address of the terminal 2. In addition, the LSMF network element does not need to send the message 3 to the SMF network element 1 for updating the routing rule 3 configured on the UPF network element 1 to the routing rule 4. The routing rule 4 includes the indication information of the LAN, the address of the terminal 2, and the corresponding path information 5. A general description is provided herein, and details are not described below again.

Optionally, according to the local area network communication method provided in this embodiment of this application, the LSMF network element may determine the address of the terminal 1, and then send the address of the terminal 1 to the SMF network element 1. Then, the SMF network element 1 sends a routing message 3 to the UPF network element 1 after receiving the address of the terminal 1. For related descriptions, refer to the embodiment shown in FIG. 5. Details are not described herein again.

In conclusion, according to the local area network communication method provided in this embodiment of this application, private communication can be implemented between the terminal 1 for which the UPF network element 1 managed by the SMF network element 1 provides the 5GLAN service corresponding to the LAN ID 1, and the terminal 2 for which the UPF network element 2 managed by the SMF network element 2 provides the 5GLAN service corresponding to the LAN ID 1. In other words, private communication across SMF network elements can be implemented for a local area network service.

Actions of the LSMF network element or actions of the SMF network element 2 in steps S601 to S615 may be performed by the processor 401 in the communications device 400 shown in FIG. 4 by invoking the application program code stored in the memory 403. This is not limited in this embodiment.

Optionally, in the embodiment shown in FIG. 5 or the embodiment shown in FIG. 6, an example in which there is no direct interface between the LSMF network element and the UPF network element is used for description. Certainly, there may be a direct interface between the LSMF network element and the UPF network element. In this case, the LSMF network element may directly communicate with the UPF network element. For example, in the embodiment shown in FIG. 5, the LSMF network element may directly send the routing rule 2 to the UPF network element 2, for configuring the routing rule 2 on the UPF network element 2. Alternatively, in the embodiment shown in FIG. 5, the LSMF network element may directly send the routing rule 1 to the UPF network element 1, for configuring the routing rule 1 on the UPF network element 1. Alternatively, in the embodiment shown in FIG. 6, the LSMF network element may directly send the routing rule 3 to the UPF network element 1, for configuring the routing rule 3 on the UPF network element 1. Alternatively, in the embodiment shown in FIG. 6, the LSMF network element may directly send the routing rule 2 to the UPF network element 2, for configuring the routing rule 2 on the UPF network element 2. This is not specifically limited in this embodiment of this application.

Figure 7:
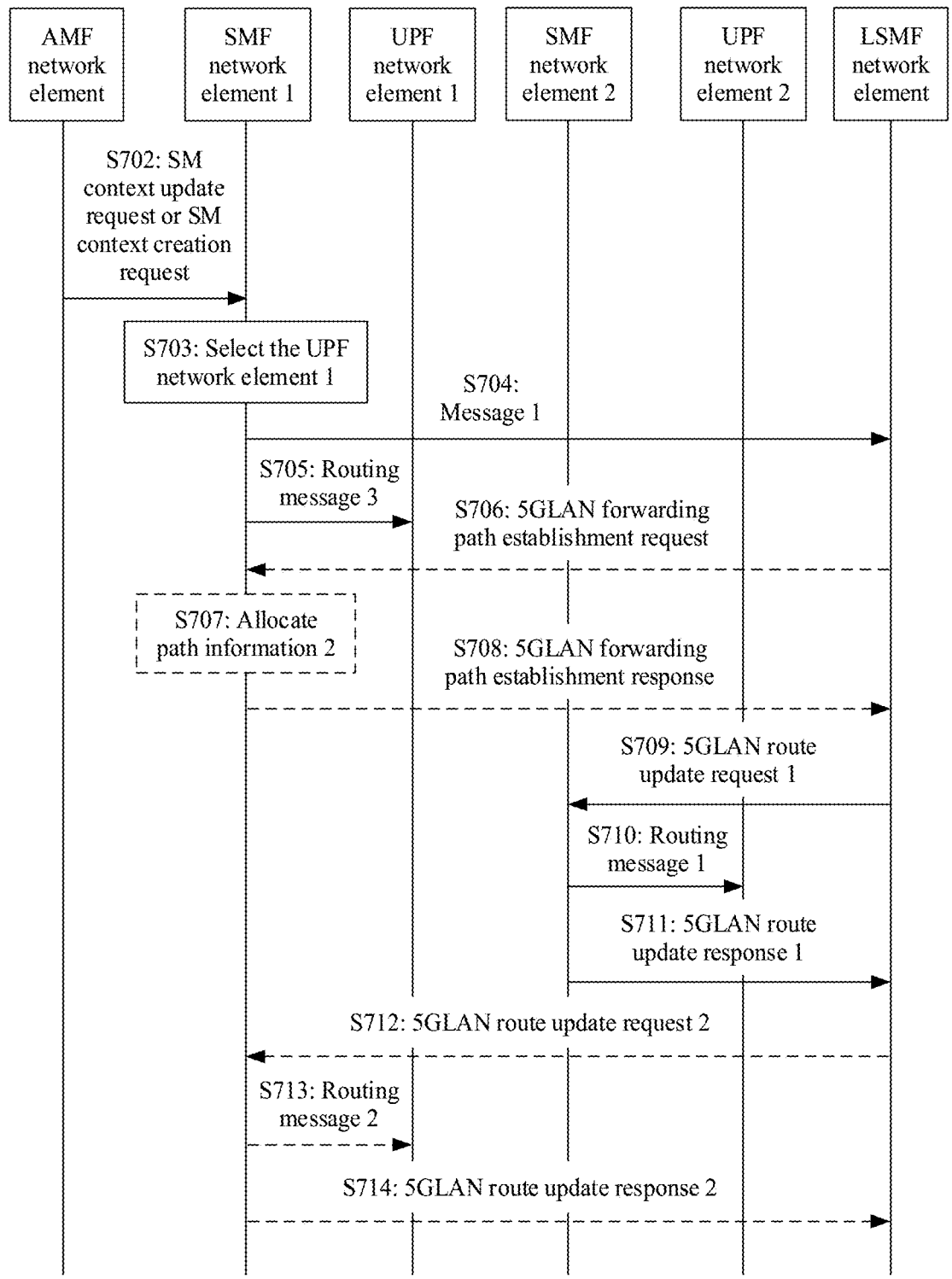
FIG. 7 is a schematic flowchart 3 of a local area network communication method according to an embodiment of this application.

Optionally, an example in which the communications system shown in FIG. 1 is applied to the 5G network shown in FIG. 2, a session management network element 1 is an SMF network element 1, a session management network element 2 is an SMF network element 2, a user plane network element 1 is a UPF network element 1, and a user plane network element 2 is a UPF network element 2 is used for description. It is assumed that in a process of creating or updating a session or another process, an LSMF network element may provide topology management and user plane path management for a 5GLAN. In addition, an SMF network element allocates path information (which corresponds to the foregoing Case 3). FIG. 7 shows a local area network communication method according to an embodiment of this application. The local area network communication method includes the following steps.

S701 and S702: Same as steps S501 and S502 in the embodiment shown in FIG. 5. For related descriptions, refer to the embodiment shown in FIG. 5. Details are not described herein again.

S703 to S705: Same as steps S604 to S606 in the embodiment shown in FIG. 6. For related descriptions, refer to the embodiment shown in FIG. 6. Details are not described herein again.

Further, after receiving the foregoing message 1, the LSMF network element may determine, based on a LAN ID (assumed as a LAN ID 1) in the message 1, and with reference to a correspondence (as shown in Table 1 or Table 2), stored by the LSMF network element when one or more terminals access a 5GLAN, between an identifier of an SMF network element, an identifier of a UPF network element, and at least one of an identifier of a terminal or an address of the terminal, an identifier of a local area network, whether another UPF network element currently provides, for another terminal, a 5GLAN service corresponding to the LAN ID 1. For example, in Table 1 or Table 2, the LSMF network element may determine that the UPF network element 2 currently provides, for a terminal 2 and a terminal 3, the 5GLAN service corresponding to the LAN ID 1. Further, for the UPF network element 2, it is assumed that the LSMF network element queries, based on the LAN ID 1, information (as shown in Table 1) that is about a terminal connected to the 5GLAN and that is on the LSMF network element, and determines it is the first time for the UPF network element 1 to provide, for the terminal 1 or any other terminal, the 5GLAN service corresponding to the LAN ID 1. In this case, optionally, the local area network communication method provided in this embodiment of this application further includes the following steps S706 to S708.

S706: The LSMF network element sends, to the SMF network element 1 corresponding to the UPF network element 1, a 5GLAN forwarding path establishment request, and the SMF network element 1 receives the 5GLAN forwarding path establishment request from the LSMF network element.

The 5GLAN forwarding path establishment request includes indication information of a LAN, an identifier of the UPF network element 1, and an identifier of the UPF network element 2, and is used to request path information 2 associated with an address of the terminal 1. For related descriptions of the path information 2, refer to the embodiment shown in FIG. 5. Details are not described herein again.

S707: The SMF network element 1 allocates the path information 2 based on the indication information of the LAN, the identifier of the UPF network element 1, and the identifier of the UPF network element 2.

S708: The SMF network element 1 sends a 5GLAN forwarding path establishment response to the LSMF network element, and the LSMF network element receives the 5GLAN forwarding path establishment response from the SMF network element 1.

The 5GLAN forwarding path establishment response includes the path information 2, and optionally includes the identifier of the UPF network element 2, the indication information of the LAN, or the like. This is not specifically limited in this embodiment of this application.

Optionally, in this embodiment of this application, it is assumed that the LSMF network element queries, based on the LAN ID 1, the information (as shown in Table 2) that is about the terminal connected to the 5GLAN and that is on the LSMF network element, and determines that it is not the first time for the UPF network element 1 to provide, for the terminal 1 or any other terminal, the 5GLAN service corresponding to the LAN ID 1. In this case, the foregoing steps S706 to S708 may not be performed. Instead, the LSMF network element determines, based on the LAN ID 1, the identifier of the UPF network element 2, and the identifier of the UPF network element 1, and with reference to correspondences shown in Table 4, the path information 2 associated with the address of the terminal 1. This is not specifically limited in this embodiment of this application.

Further, after the LSMF network element determines the path information 2 associated with the address of the terminal 1, the local area network communication method provided in this embodiment of this application may further include the following steps S709 and S710.

S709 and S710: Same as steps S506 and S507 in the embodiment shown in FIG. 5. For related descriptions, refer to the embodiment shown in FIG. 5. Details are not described herein again.

S711: The SMF network element 2 sends a 5GLAN route update response 1 to the LSMF network element, and the LSMF network element receives the 5GLAN route update response 1 from the SMF network element 2.

Optionally, in this embodiment of this application, if the SMF network element 2 determines that path information 1 corresponding to the path information 2 does not exist on the UPF network element 2, the SMF network element 2 needs to include the path information 1 in the 5GLAN route update response 1. Optionally, the 5GLAN route update response 1 may further carry the identifier of the UPF network element 2. This is not specifically limited in this embodiment of this application. For example, if it is the first time for the UPF network element 1 to provide, for the terminal 1 or any other terminal, the 5GLAN service corresponding to the LAN ID 1, the SMF network element 2 may determine that the path information 1 corresponding to the path information 2 does not exist on the UPF network element 2. This is not specifically limited in this embodiment of this application. For related descriptions of the path information 1, refer to the embodiment shown in FIG. 5. Details are not described herein again.

Optionally, in this embodiment of this application, it is assumed that the LSMF network element queries, based on the LAN ID 1, information (as shown in Table 1) that is about the terminal connected to the 5GLAN and that is on the LSMF network element, and determines it is the first time for the UPF network element 1 to provide, for the terminal 1 or any other terminal, the 5GLAN service corresponding to the LAN ID 1. In this case, the local area network communication method provided in this embodiment of this application may further include the following steps S712 to S714.

S712 to S714: Similar to steps S510 to S512 in the embodiment shown in FIG. 5, and a difference lies in that in this embodiment of this application, because the SMF network element 1 may determine the address of the terminal 1, a 5GLAN route update request 2 in step S712 may not carry the address of the terminal 1. For other related descriptions, refer to the embodiment shown in FIG. 5. Details are not described herein again.

Optionally, according to the local area network communication method provided in this embodiment of this application, the LSMF network element may determine the address of the terminal 1, and then send the address of the terminal 1 to the SMF network element 1. Then, the SMF network element 1 sends a routing message 3 to the UPF network element 1 after receiving the address of the terminal 1. For related descriptions, refer to the embodiment shown in FIG. 5. Details are not described herein again.

It should be noted that, the foregoing steps S706 to S714 are described using merely an example in which after the LSMF network element receives the foregoing message 1, the LSMF network element determines, based on the LAN ID (assuming as the LAN ID 1) in the message 1 and with reference to the correspondence (as shown in Table 1 or Table 2), stored by the LSMF network element when one or more terminals access the 5GLAN, between the identifier of the local area network, the identifier of the SMF network element, the identifier of the UPF network elements, and at least one of the identifier of the terminal or the address of the terminal, that the UPF network element 2 currently provides, for the terminal 2 and the terminal 3, the 5GLAN service corresponding to the LAN ID 1. Certainly, if another UPF network element provides, for another terminal, the 5GLAN service corresponding to the LAN ID 1, for a corresponding local area network communication method for the UPF network element, refer to the foregoing steps S706 to S714. The difference lies only in that the UPF network element 2 in the foregoing steps S706 to S714 needs to be replaced by the UPF network element, the SMF network element 2 in the foregoing steps S706 to S714 needs to be replaced by an SMF network element corresponding to the UPF network element, and the terminal 2 and the terminal 3 in the foregoing steps S706 to S714 need to be replaced by a terminal for which the UPF network element provides access to the local area network. For other related descriptions, refer to the foregoing steps S706 to S714. Details are not described herein again.

In conclusion, according to the local area network communication method provided in this embodiment of this application, private communication can be implemented between the terminal 1 for which the UPF network element 1 managed by the SMF network element 1 provides the 5GLAN service corresponding to the LAN ID 1, and the terminal 2 for which the UPF network element 2 managed by the SMF network element 2 provides the 5GLAN service corresponding to the LAN ID 1. In other words, private communication across SMF network elements can be implemented for a local area network service.

Actions of the LSMF network element or actions of the SMF network element 2 in steps S702 to S714 may be performed by the processor 401 in the communications device 400 shown in FIG. 4 by invoking the application program code stored in the memory 403. This is not limited in this embodiment.

Figure 8:
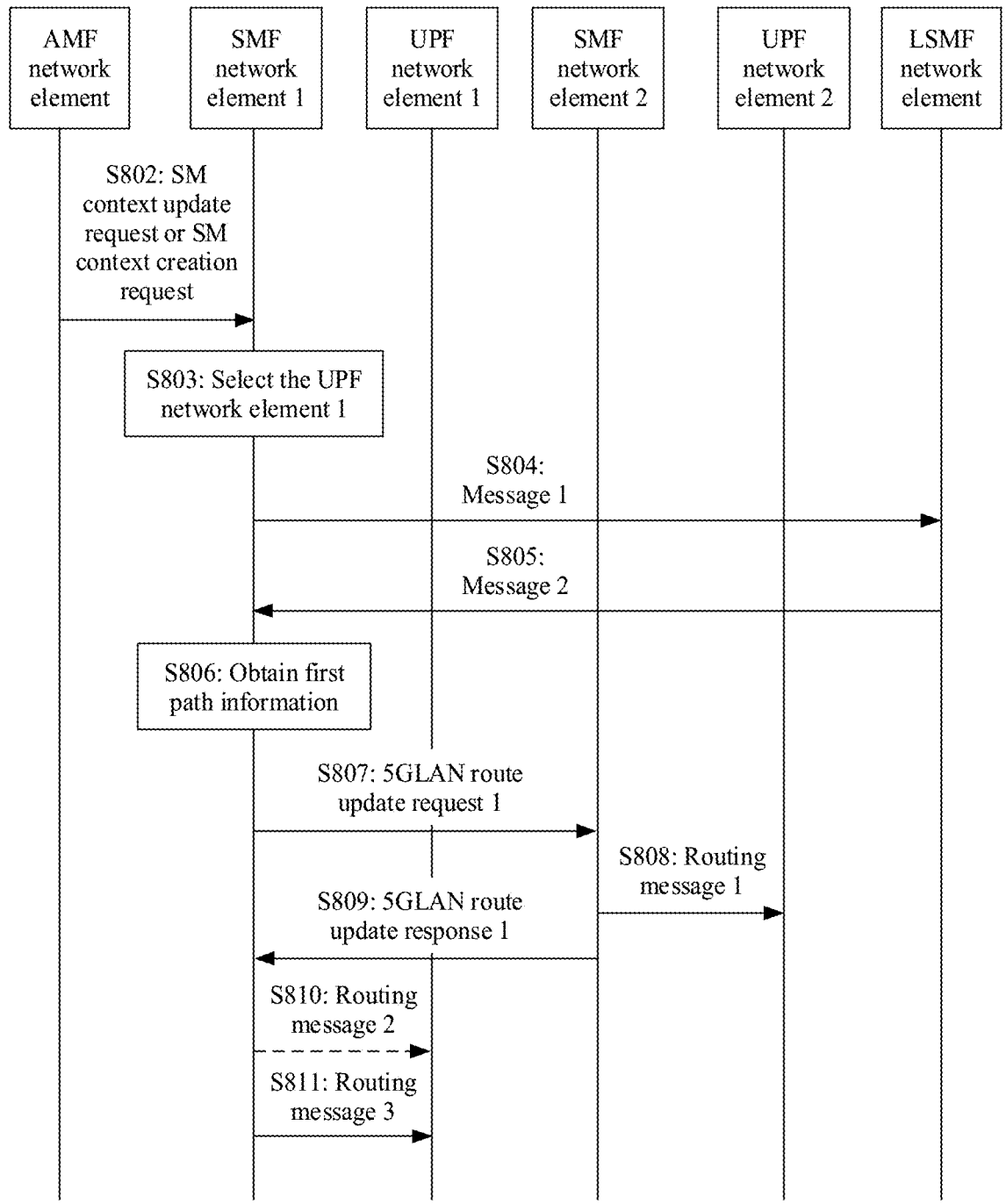
FIG. 8 is a schematic flowchart 4 of a local area network communication method according to an embodiment of this application.

Optionally, an example in which the communications system shown in FIG. 1 is applied to the 5G network shown in FIG. 2, a session management network element 1 is an SMF network element 1, a session management network element 2 is an SMF network element 2, a user plane network element 1 is a UPF network element 1, and a user plane network element 2 is a UPF network element 2 is used for description. It is assumed that the LSMF network element does not provide user plane path management for a 5GLAN. Instead, different SMF network elements negotiate with each other for updating path information (which corresponds to the foregoing case 4). FIG. 8 shows a local area network communication method according to an embodiment of this application. The local area network communication method includes the following steps.

S801 to S804: Same as steps S501 to S504 in the embodiment shown in FIG. 5. For related descriptions, refer to the embodiment shown in FIG. 5. Details are not described herein again.

Further, after receiving the foregoing message 1, the LSMF network element may determine, based on a LAN ID (assumed as a LAN ID 1) in the message 1, and with reference to a correspondence (as shown in Table 1 or Table 2), stored by the LSMF network element when one or more terminals access a 5GLAN, between an identifier of an SMF network element, an identifier of a UPF network element, and at least one of an identifier of a terminal or an address of the terminal, an identifier of a local area network, whether another UPF network element currently provides, for another terminal, a 5GLAN service corresponding to the LAN ID 1. For example, in Table 1 or Table 2, the LSMF network element may determine that the UPF network element 2 currently provides, for a terminal 2 and a terminal 3, the 5GLAN service corresponding to the LAN ID 1. Further, for the UPF network element 2, the local area network communication method provided in this embodiment of this application further includes the following steps S805 to S810.

S805: The LSMF network element sends a message 2 to the SMF network element 1, and the SMF network element 1 receives the message 2 from the LSMF network element. The message 2 includes an address of a terminal 1, an identifier of the SMF network element 2, and an identifier of the UPF network element 2.

Optionally, the message 2 may further include an address of the terminal 2 and an address of the terminal 3 for which the UPF network element 2 provides the 5GLAN service corresponding to the LAN ID 1 and/or indication information of a LAN. This is not specifically limited in this embodiment of this application. For related descriptions of the indication information of the LAN, refer to the embodiment shown in FIG. 5. Details are not described herein again.

S806: Similar to step S505 in the embodiment shown in FIG. 5, and a difference lies in the following: The LSMF network element in the embodiment shown in FIG. 5 is replaced by the SMF network element 1 in this embodiment of this application; and the LAN ID in the embodiment shown in FIG. 5 is replaced by the indication information of the LAN in this embodiment of this application. In addition, in this embodiment of this application, the SMF network element 1 determines, based on the indication information of the LAN, whether it is the first time for the UPF network element 1 to provide, for the terminal 1 or any other terminal, the 5GLAN service corresponding to the LAN ID. For other related descriptions, refer to the embodiment shown in FIG. 5. Details are not described herein again.

S807: The SMF network element 1 sends a 5GLAN route update request 1 to the SMF network element 2 corresponding to the identifier of the SMF network element 2, and the SMF network element 2 receives the 5GLAN route update request 1 from the SMF network element 1.

The 5GLAN route update request 1 includes the indication information of the LAN, the address of the terminal 1, the identifier of the UPF network element 2, and corresponding path information 2.

S808: Same as step S507 in the embodiment shown in FIG. 5. For related descriptions, refer to the embodiment shown in FIG. 5. Details are not described herein again.

S809: Similar to step S711 in the embodiment shown in FIG. 7, and a difference lies in that the LSMF network element in the embodiment shown in FIG. 5 is replaced by the SMF network element 1 in this embodiment of this application. In addition, it is assumed that the message 2 in step S805 does not include the address of the terminal 2 and the address of the terminal 3, where the UPF network element 2 provides the 5GLAN service corresponding to the LAN ID 1 for the terminal 2 and the terminal 3. In this case, a 5GLAN route update response 1 further includes the address of the terminal 2 and the address of the terminal 3. This is not specifically limited in this embodiment of this application.

Optionally, in this embodiment of this application, if the SMF network element 1 determines it is the first time for the UPF network element 1 to provide, for the terminal 1 or any other terminal, the 5GLAN service corresponding to the LAN ID, the local area network communication method provided in this embodiment of this application further includes the following step S810.

S810: Same as step S511 in the embodiment shown in FIG. 5. For related descriptions, refer to the embodiment shown in FIG. 5. Details are not described herein again.

It should be noted that, the foregoing steps S805 to S810 are described using merely an example in which after the LSMF network element receives the foregoing message 1, the LSMF network element determines, based on the LAN ID (assuming as the LAN ID 1) in the message 1 and with reference to the correspondence (as shown in Table 1 or Table 2), stored by the LSMF network element when one or more terminals access the 5GLAN, between the identifier of the local area network, the identifier of the SMF network element, the identifier of the UPF network elements, and at least one of the identifier of the terminal or the address of the terminal, that the UPF network element 2 currently provides, for the terminal 2 and the terminal 3, the 5GLAN service corresponding to the LAN ID 1. Certainly, if another UPF network element provides, for another terminal, the 5GLAN service corresponding to the LAN ID 1, for a corresponding local area network communication method for the UPF network element, refer to the foregoing steps S805 to S810. The difference lies only in that the UPF network element 2 in the foregoing steps S805 to S810 needs to be replaced by the UPF network element, the SMF network element 2 in the foregoing steps S805 to S810 needs to be replaced by an SMF network element corresponding to the UPF network element, and the terminal 2 and the terminal 3 in the foregoing steps S805 to S810 need to be replaced by a terminal for which the UPF network element provides access to the local area network. For other related descriptions, refer to the foregoing steps S805 to S810. Details are not described herein again.

Further, after the SMF network element 1 obtains the address of the terminal 1, the local area network communication method provided in this embodiment of this application further includes the following step S811.

S811: Same as step S513 in the embodiment shown in FIG. 5. For related descriptions, refer to the embodiment shown in FIG. 5. Details are not described herein again.

Optionally, in this embodiment of this application, the SMF network element 1 may determine the address of the terminal 1. In this way, the message 1 in step S804 may include the address of the terminal 1. The message 1 optionally includes the identifier of the terminal 1. Further, the 5GLAN route update response 1 in step S809 may not include the address of the terminal 1. The SMF network element 1 performs step S811 after determining the address of the terminal 1. This is not specifically limited in this embodiment of this application.

In conclusion, according to the local area network communication method provided in this embodiment of this application, private communication can be implemented between the terminal 1 for which the UPF network element 1 managed by the SMF network element 1 provides the 5GLAN service corresponding to the LAN ID 1, and the terminal 2 for which the UPF network element 2 managed by the SMF network element 2 provides the 5GLAN service corresponding to the LAN ID 1. In other words, private communication across SMF network elements can be implemented for a local area network service.

Actions of the SMF network element 1 in steps S802 to S811 may be performed by the processor 401 in the communications device 400 shown in FIG. 4 by invoking the application program code stored in the memory 403. This is not limited in this embodiment.

The foregoing mainly describes the solutions provided in the embodiments of this application from a perspective of interaction between the network elements. It may be understood that, to implement the foregoing functions, the service management network element, a first session management network element, or a second session management network element includes corresponding a hardware structure and/or software module for performing the functions. A person skilled in the art should be aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement a described function for each particular application, but it should not be considered that the implementation goes beyond the scope of this application.

In the embodiments of this application, the service management network element, the first session management network element, or the second session management network element may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division during actual implementation.

Figure 9:
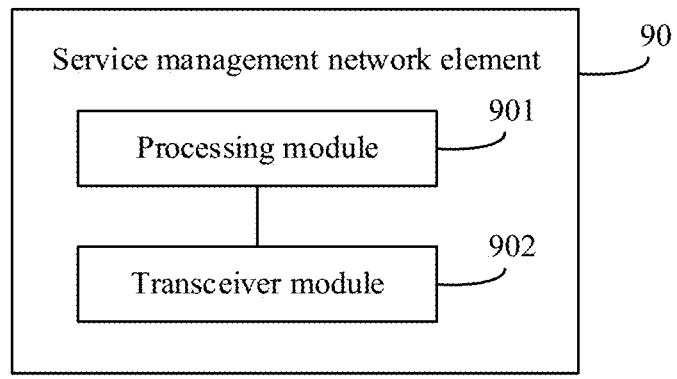
FIG. 9 is a schematic structural diagram of a service management network element according to an embodiment of this application.

For example, when functional modules are obtained through division in an integrated manner, FIG. 9 is a schematic structural diagram of a service management network element 90. The service management network element 90 includes a processing module 901 and a transceiver module 902. The processing module 901 is configured to determine, based on indication information of a local area network, first path information associated with a first address. The first path information is used by a second user plane network element to route data whose destination address is the first address to a first user plane network element. The first user plane network element provides access to the local area network for a terminal corresponding to the first address. The transceiver module 902 is configured to send a first message to a second session management network element, for configuring a first routing rule on the second user plane network element. The first routing rule includes the indication information of the local area network, the first address, and the first path information.

Optionally, the first address is an address of a first terminal, and the first message includes an identifier of the second user plane network element and the first routing rule. The transceiver module 902 is further configured to receive a second message from a first session management network element. The second message includes an identifier of the first user plane network element and an identifier of the local area network. Correspondingly, the indication information of the local area network is the identifier of the local area network. The processing module 901 is configured to: determine the identifier of the second user plane network element based on the identifier of the local area network; and determine, based on the identifier of the local area network, the identifier of the second user plane network element, and the identifier of the first user plane network element, the first path information associated with the address of the first terminal.

Optionally, the second message further includes an identifier of the first terminal. The processing module 901 is further configured to determine the address of the first terminal corresponding to the identifier of the first terminal. The transceiver module 902 is further configured to send the address of the first terminal to the first session management network element, for configuring, on the first user plane network element, second path information that indicates routing to the first terminal.

Alternatively, optionally, the second message further includes the address of the first terminal.

Optionally, that the processing module 901 is configured to determine, based on the identifier of the local area network, the identifier of the second user plane network element, and the identifier of the first user plane network element, the first path information associated with the address of the first terminal includes: determining, based on the identifier of the first user plane network element and the identifier of the local area network, that it is the first time for the first user plane network element to provide access to the local area network; and allocating, based on the identifier of the local area network, the identifier of the second user plane network element, and the identifier of the first user plane network element, the first path information associated with the address of the first terminal.

Optionally, the transceiver module 902 is further configured to send a third message to the first session management network element, for configuring a second routing rule on the first user plane network element. The second routing rule includes the indication information of the local area network, an address of a second terminal, and third path information. The third path information is used by the first user plane network element to route data whose destination address is the address of the second terminal to the second user plane network element. Further, the second terminal is a terminal for which the second user plane network element provides access to the local area network.

Optionally, the first address is a destination address corresponding to data for which no path information can be matched by the second user plane network element, and the first message includes the first path information. The transceiver module 902 is further configured to receive a fourth message from the second session management network element. The fourth message includes the indication information of the local area network, indication information of the second user plane network element, and the first address. Correspondingly, that the processing module 901 is configured to determine, based on the indication information of the local area network, the first path information associated with the first address includes: determining an identifier of the first user plane network element based on the indication information of the local area network and the first address; and determining, based on the indication information of the local area network, the indication information of the second user plane network element, and the identifier of the first user plane network element, the first path information associated with the first address.

Optionally, the indication information of the second user plane network element is a second address, and the second address is a source address corresponding to the data for which no path information can be matched by the second user plane network element. The transceiver module 902 is further configured to send a fifth message to a first session management network element, for configuring a third routing rule on the first user plane network element. The fifth message includes the indication information of the local area network, the second address, the identifier of the first user plane network element, and fourth path information. The third routing rule includes the indication information of the local area network, the second address, and the fourth path information. Further, the fourth path information is used by the first user plane network element to route data whose destination address is the second address to the second user plane network element.

Optionally, the transceiver module 902 is further configured to receive a sixth message from the second session management network element. The sixth message includes the indication information of the local area network, an identifier of the second user plane network element, and the first address, and is used to cancel updating of path information associated with the indication information of the local area network, the first address, and the identifier of the second user plane network element. The processing module 901 is further configured to stop, based on the sixth message, sending, to the second session management network element, the path information associated with the indication information of the local area network, the first address, and the identifier of the second user plane network element.

All related content of the steps in the foregoing method embodiments may be cited in function descriptions of corresponding functional modules. Details are not described herein again.

In this embodiment, the service management network element 90 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In an embodiment, a person skilled in the art may figure out that the service management network element 90 may be in a form shown in FIG. 4.

For example, the processor 401 in FIG. 4 may invoke the computer-executable instruction stored in the memory 403, to enable the service management network element 90 to perform the local area network communication method in the foregoing method embodiments.

Functions/implementation processes of the transceiver module 902 and the processing module 901 in FIG. 9 may be implemented by the processor 401 in FIG. 4 by invoking the computer-executable instruction stored in the memory 403. Alternatively, functions/implementation processes of the processing module 901 in FIG. 9 may be implemented by the processor 401 in FIG. 4 by invoking the computer-executable instruction stored in the memory 403, and functions/implementation processes of the transceiver module 902 in FIG. 9 may be implemented by the communications interface 404 in FIG. 4.

The service management network element 90 provided in this embodiment may perform the foregoing local area network communication method. Therefore, for technical effects that can be achieved by the service management network element 90, refer to the foregoing method embodiments. Details are not described herein again.

Optionally, an embodiment of this application further provides an apparatus (for example, the apparatus may be a chip system). The apparatus includes a processor configured to support a service management network element in implementing the local area network communication method, for example, determining, based on indication information of a local area network, first path information associated with a first address. In a possible design, the apparatus further includes a memory. The memory is configured to store a program instruction and data that are necessary for the service management network element. Certainly, the memory may alternatively not be in the apparatus. When the apparatus is a chip system, the apparatus may include a chip, or may include a chip and another discrete device. This is not specifically limited in this embodiment of this application.

Figure 10:
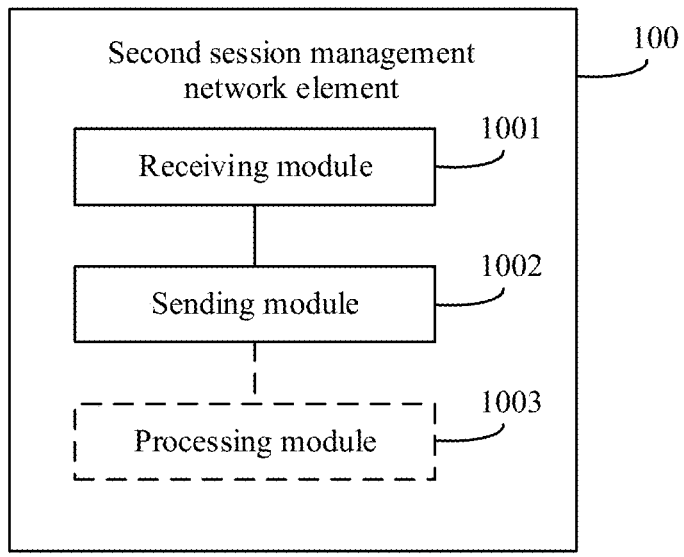
FIG. 10 is a schematic structural diagram of a second session management network element according to an embodiment of this application.

Alternatively, for example, the functional modules are obtained through division in an integrated manner. FIG. 10 is a schematic structural diagram of a second session management network element 100. The second session management network element 100 includes a receiving module 1001 and a sending module 1002. The receiving module 1001 is configured to receive a first message from a service management network element. The sending module 1002 is configured to send, based on the first message, a first routing rule to a second user plane network element, for configuring the first routing rule on the second user plane network element. The first routing rule includes indication information of a local area network, a first address, and first path information associated with the first address. The first path information is used by the second user plane network element to route data whose destination address is the first address to a first user plane network element. The first user plane network element provides access to the local area network for a terminal corresponding to the first address.

Optionally, the receiving module 1001 is further configured to receive a first address report from the second user plane network element. The first address report includes the indication information of the local area network and the first address. Alternatively, the first address report includes the indication information of the local area network, the first address, and a second address. The first address is a destination address corresponding to data for which no path information can be matched by the second user plane network element. The second address is a source address corresponding to the data for which no path information can be matched by the second user plane network element. The sending module 1002 is further configured to send a fourth message to the service management network element. The fourth message includes the indication information of the local area network, indication information of the second user plane network element, and the first address, and is used to determine the first path information associated with the first address.

Optionally, the receiving module 1001 is further configured to receive a second address report from the second user plane network element. The second address report includes the indication information of the local area network and the first address. The second address report is triggered when the second user plane network element detects no data associated with the first address within a preset time. The sending module 1002 is further configured to send a sixth message to the service management network element. The sixth message includes the indication information of the local area network, an identifier of the second user plane network element, and the first address, and is used to cancel updating of path information associated with the indication information of the local area network, the identifier of the second user plane network element, and the first address.

Optionally, the sending module 1002 is further configured to send a seventh message to the service management network element. The seventh message includes an identifier of the local area network, the second address, an identifier of the second session management network element, and the identifier of the second user plane network element, and is used to update information about a terminal connected to the local area network.

Optionally, as shown in FIG. 10, the second session management network element 100 in this embodiment of this application may further include a processing module 1003. The processing module 1003 is configured to determine that third path information corresponding to the first path information does not exist on the second user plane network element. The third path information is used by the first user plane network element to route data whose destination address is an address of a second terminal to the second user plane network element. The second terminal is a terminal for which the second user plane network element provides access to the local area network. The sending module 1002 is further configured to send the third path information to the service management network element.

All related content of the steps in the foregoing method embodiments may be cited in function descriptions of corresponding functional modules. Details are not described herein again.

In this embodiment, the second session management network element 100 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In an embodiment, the second session management network element 100 may be in a form shown in FIG. 4.

For example, the processor 401 in FIG. 4 may invoke the computer-executable instruction stored in the memory 403, to enable the second session management network element 100 to perform the local area network communication method in the foregoing method embodiments.

Functions/implementation processes of the receiving module 1001, the sending module 1002, and the processing module 1003 in FIG. 10 may be implemented by the processor 401 in FIG. 4 by invoking the computer-executable instruction stored in the memory 403. Alternatively, functions/implementation processes of the processing module 1003 in FIG. 10 may be implemented by the processor 401 in FIG. 4 by invoking the computer-executable instruction stored in the memory 403, and functions/implementation processes of the receiving module 1001 and the sending module 1002 in FIG. 10 may be implemented by the communications interface 404 in FIG. 4.

The second session management network element 100 provided in this embodiment may perform the foregoing local area network communication method. Therefore, for technical effects that can be achieved by the second session management network element 100, refer to the foregoing method embodiments. Details are not described herein again.

Optionally, an embodiment of this application further provides an apparatus (for example, the apparatus may be a chip system). The apparatus includes a processor configured to support a second session management network element in implementing the local area network communication method, for example, determining that third path information corresponding to first path information does not exist on a second user plane network element. In a possible design, the apparatus further includes a memory. The memory is configured to store a program instruction and data that are necessary for the second session management network element. Certainly, the memory may alternatively not be in the apparatus. When the apparatus is a chip system, the apparatus may include a chip, or may include a chip and another discrete device. This is not specifically limited in this embodiment of this application.

Figure 11:
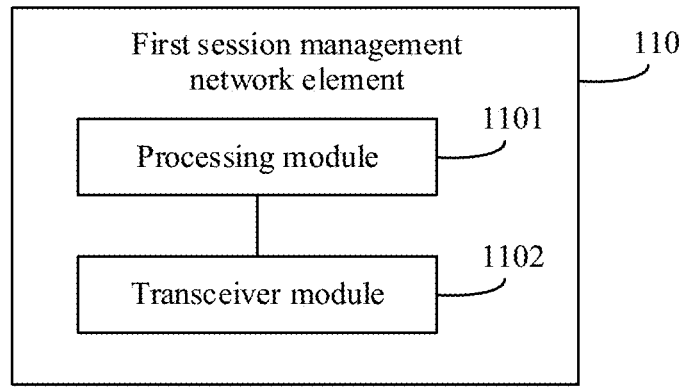
FIG. 11 is a schematic structural diagram of a first session management network element according to an embodiment of this application.

Alternatively, for example, the functional modules are obtained through division in an integrated manner. FIG. 11 is a schematic structural diagram of a first session management network element 110. The first session management network element 110 includes a processing module 1101 and a transceiver module 1102. The processing module 1101 is configured to determine first path information associated with an address of a first terminal. The first path information is used by a second user plane network element to route data whose destination address is the address of the first terminal to a first user plane network element. The first user plane network element provides access to a local area network for the first terminal. The transceiver module 1102 is configured to send a first message to a second session management network element, for configuring a first routing rule on the second user plane network element. The first routing rule includes indication information of the local area network, the address of the first terminal, and the first path information.

Optionally, the transceiver module 1102 is further configured to receive a second message from a service management network element. The second message includes an identifier of the second user plane network element. Correspondingly, that the processing module 1101 is configured to determine the first path information associated with the address of the first terminal includes: determining, based on the indication information of the local area network, an identifier of the first user plane network element, and the identifier of the second user plane network element, the first path information associated with the address of the first terminal.

Optionally, that the processing module 1101 is configured to determine, based on the indication information of the local area network, the identifier of the first user plane network element, and the identifier of the second user plane network element, the first path information associated with the address of the first terminal includes: determining, based on the indication information of the local area network and the identifier of the first user plane network element, that it is the first time for the first user plane network element to provide access to the local area network; and allocating, based on the indication information of the local area network, the identifier of the first user plane network element, and the identifier of the second user plane network element, the first path information associated with the address of the first terminal.

Optionally, the second message further includes an address of a second terminal. The second terminal is a terminal for which the second user plane network element provides access to the local area network. The transceiver module 1102 is further configured to receive, from the second session management network element, third path information associated with the address of the second terminal. The third path information is used by the first user plane network element to route data whose destination address is the address of the second terminal to the second user plane network element. The transceiver module 1102 is further configured to send a second routing rule to the first user plane network element, for configuring the second routing rule on the first user plane network element. The second routing rule includes the indication information of the local area network, the address of the second terminal, and the third path information.

Optionally, the transceiver module 1102 is further configured to send a third message to the service management network element. The third message includes an identifier of the first terminal or the address of the first terminal, an identifier of the first session management network element, the identifier of the first user plane network element, and an identifier of the local area network, and is used to update information about a terminal connected to the local area network.

All related content of the steps in the foregoing method embodiments may be cited in function descriptions of corresponding functional modules. Details are not described herein again.

In this embodiment, the first session management network element 110 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In an embodiment, the first session management network element 110 may be in a form shown in FIG. 4.

For example, the processor 401 in FIG. 4 may invoke the computer-executable instruction stored in the memory 403, to enable the first session management network element 110 to perform the local area network communication method in the foregoing method embodiments.

Functions/implementation processes of the transceiver module 1102 and the processing module 1101 in FIG. 11 may be implemented by the processor 401 in FIG. 4 by invoking the computer-executable instruction stored in the memory 403. Alternatively, functions/implementation processes of the processing module 1101 in FIG. 11 may be implemented by the processor 401 in FIG. 4 by invoking the computer-executable instruction stored in the memory 403, and functions/implementation processes of the transceiver module 1102 in FIG. 11 may be implemented by the communications interface 404 in FIG. 4.

The first session management network element 110 provided in this embodiment may perform the foregoing local area network communication method. Therefore, for technical effects that can be achieved by the first session management network element 110, refer to the foregoing method embodiments. Details are not described herein again.

Optionally, an embodiment of this application further provides an apparatus (for example, the apparatus may be a chip system). The apparatus includes a processor configured to support a first session management network element in implementing the local area network communication method, for example, determining first path information associated with an address of a first terminal. In a possible design, the apparatus further includes a memory. The memory is configured to store a program instruction and data that are necessary for the first session management network element. Certainly, the memory may alternatively not be in the apparatus. When the apparatus is a chip system, the apparatus may include a chip, or may include a chip and another discrete device. This is not specifically limited in this embodiment of this application.

All or some of the foregoing embodiments may be implemented using software, hardware, firmware, or any combination thereof. When a software program is used to implement the embodiments, all or some of the embodiments may be implemented in a form of a computer program product. The computer program product includes one or more computer instructions. When computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a procedure of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to example features and the embodiments thereof, it is clear that various modifications and combinations may be made to them without departing from the scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A local area network communication method, comprising:
   determining, by a service management network element based on indication information of a local area network, first path information associated with a first address, wherein the first path information indicates routing data whose destination address is the first address to a first user plane network element, and wherein the first user plane network element provides access to the local area network for a terminal corresponding to the first address; and
   sending, by the service management network element, a first message to a second session management network element,
   wherein the first message is for configuring a first routing rule on a second user plane network element, and
   wherein the first routing rule comprises the indication information, the first address, and the first path information.

2. The local area network communication method according to claim 1, wherein the first address is of a first terminal, wherein the first message comprises an identifier of the second user plane network element and the first routing rule, wherein before determining the first path information, the local area network communication method further comprises receiving, by the service management network element, a second message from a first session management network element, wherein the second message comprises an identifier of the first user plane network element and an identifier of the local area network, wherein the indication information is the identifier of the local area network, and wherein determining the first path information comprises:
   determining, by the service management network element, the identifier of the second user plane network element based on the identifier of the local area network; and
   determining, by the service management network element, the first path information based on the identifier of the local area network, the identifier of the second user plane network element, and the identifier of the first user plane network element.

3. The local area network communication method according to claim 2, wherein the second message further comprises an identifier of the first terminal, and wherein after receiving the second message from the first session management network element, the local area network communication method further comprises:
   determining, by the service management network element, the address of the first terminal corresponding to the identifier of the first terminal; and
   sending, by the service management network element, the address of the first terminal to the first session management network element, wherein the address of the first terminal is for configuring, on the first user plane network element, second path information that indicates routing to the first terminal.

4. The local area network communication method according to claim 2, wherein determining the first path information comprises:
   determining, by the service management network element based on the identifier of the first user plane network element and the identifier of the local area network, that it is a first time for the first user plane network element to provide access to the local area network; and
   allocating, by the service management network element, the first path information based on the identifier of the local area network, the identifier of the second user plane network element, and the identifier of the first user plane network element.

5. The local area network communication method according to claim 4, wherein after determining, by the service management network element, that it is the first time for the first user plane network element to provide access to the local area network, the local area network communication method further comprises:
   sending, by the service management network element, a third message to the first session management network element, wherein the third message is for configuring a second routing rule on the first user plane network element, wherein the second routing rule comprises the indication information, an address of a second terminal, and third path information, wherein the third path information indicates routing data whose destination address is the address of the second terminal to the second user plane network element, and wherein the second user plane network element provides the second terminal access to the local area network.

6. The local area network communication method according to claim 1, wherein the first address is a destination address corresponding to data for which no path information can be matched by the second user plane network element, wherein the first message comprises the first path information, wherein before determining the first path information, the local area network communication method further comprises receiving, by the service management network element, a fourth message from the second session management network element, wherein the fourth message comprises the indication information, second indication information of the second user plane network element, and the first address, and wherein determining the first path information comprises:
   determining, by the service management network element, an identifier of the first user plane network element based on the indication information and the first address; and
   determining, by the service management network element, the first path information based on the indication information, the second indication information, and the identifier of the first user plane network element.

7. The local area network communication method according to claim 6, wherein the second indication information is a second address, wherein the second address is a source address corresponding to the data for which no path information can be matched by the second user plane network element, and wherein after receiving the fourth message from the second session management network element, the local area network communication method further comprises:

sending, by the service management network element, a fifth message to a first session management network element, wherein the fifth message is for configuring a third routing rule on the first user plane network element, wherein the fifth message comprises the indication information, the second address, the identifier of the first user plane network element, and fourth path information, wherein the third routing rule comprises the indication information, the second address, and the fourth path information, and wherein the fourth path information indicates routing data whose destination address is the second address to the second user plane network element.

8. The local area network communication method according to claim 6, further comprising:

receiving, by the service management network element, a sixth message from the second session management network element, wherein the sixth message comprises the indication information, an identifier of the second user plane network element, and the first address, and wherein the sixth message is to cancel updating of path information associated with the indication information, the first address, and the identifier of the second user plane network element; and refraining, by the service management network element based on the sixth message, from sending, to the second session management network element, the path information associated with the indication information, the first address, and the identifier of the second user plane network element.

9. A local area network communication method, comprising:

receiving, by a second session management network element, a first message from a service management network element; and sending, by the second session management network element based on the first message, a first routing rule to a second user plane network element, wherein the first routing rule is for configuring the first routing rule on the second user plane network element, wherein the first routing rule comprises indication information of a local area network, a first address, and first path information associated with the first address, wherein the first path information indicates routing data whose destination address is the first address to a first user plane network element, and wherein the first user plane network element provides access to the local area network for a terminal corresponding to the first address.

10. The local area network communication method according to claim 9, wherein before receiving the first message, the local area network communication method further comprises:

receiving, by the second session management network element, a first address report from the second user plane network element, wherein the first address report comprises the indication information and the first address or the first address report comprises the indication information, the first address, and a second address, wherein the first address is a destination address corresponding to data for which no path information can be matched by the second user plane network element, and wherein the second address is a source address corresponding to the data for which no path information can be matched by the second user plane network element; and sending, by the second session management network element, a fourth message to the service management network element, wherein the fourth message comprises the indication information, second indication information of the second user plane network element, and the first address, and wherein the fourth message is to determine the first path information associated with the first address.

11. The local area network communication method according to claim 9, further comprising:

receiving, by the second session management network element, a second address report from the second user plane network element, wherein the second address report comprises the indication information and the first address, and wherein the second address report is triggered when the second user plane network element detects no data associated with the first address within a preset time; and sending, by the second session management network element, a sixth message to the service management network element, wherein the sixth message comprises the indication information, an identifier of the second user plane network element, and the first address, and wherein the sixth message is to cancel updating of path information associated with the indication information, the identifier of the second user plane network element, and the first address.

12. A service management network element, comprising:
at least one processor; and
a memory coupled to the at least one processor and having program instructions stored thereon which, when executed by the at least one processor, cause the service management network element to:

determine, based on indication information of a local area network, first path information associated with a first address, wherein the first path information indicates routing data whose destination address is the first address to a first user plane network element, and wherein the first user plane network element provides access to the local area network for a terminal corresponding to the first address; and send a first message to a second session management network element, wherein the first message is for configuring a first routing rule on a second user plane network element, and wherein the first routing rule comprises the indication information, the first address, and the first path information.

13. The service management network element according to claim 12, wherein the first address is an address of a first terminal, wherein the first message comprises an identifier of the second user plane network element and the first routing rule, and wherein the instructions, when executed by the at least one processor, further cause the service management network element to:

receive a second message from a first session management network element, wherein the second message comprises an identifier of the first user plane network element and an identifier of the local area network, wherein the indication information is the identifier of the local area network;

determine the identifier of the second user plane network element based on the identifier of the local area network; and determine the first path information based on the identifier of the local area network, the identifier of the second user plane network element, and the identifier of the first user plane network element.

14. The service management network element according to claim 13, wherein the second message further comprises an identifier of the first terminal, and wherein the instructions, when executed by the at least one processor, further cause the service management network element to:
   determine the address of the first terminal corresponding to the identifier of the first terminal; and
   send the address of the first terminal to the first session management network element, wherein the address of the first terminal is for configuring, on the first user plane network element, second path information that indicates routing to the first terminal.

15. The service management network element according to claim 13, wherein the instructions, when executed by the at least one processor, further cause the service management network element to:
   determine, based on the identifier of the first user plane network element and the identifier of the local area network, that it is a first time for the first user plane network element to provide access to the local area network; and
   allocate the first path information based on the identifier of the local area network, the identifier of the second user plane network element, and the identifier of the first user plane network element.

16. The service management network element according to claim 15, wherein the instructions, when executed by the at least one processor, further cause the service management network element to send a third message to the first session management network element, wherein the third message is for configuring a second routing rule on the first user plane network element, wherein the second routing rule comprises the indication information, an address of a second terminal, and third path information, wherein the third path information indicates routing data whose destination address is the address of the second terminal to the second user plane network element, and wherein the second user plane network element provides the second terminal access to the local area network.

17. The service management network element according to claim 12, wherein the first address is a destination address corresponding to data for which no path information can be matched by the second user plane network element, wherein the first message comprises the first path information, and wherein the instructions, when executed by the at least one processor, further cause the service management network element to:
   receive a fourth message from the second session management network element, wherein the fourth message comprises the indication information, second indication information of the second user plane network element, and the first address;
   determine an identifier of the first user plane network element based on the indication information and the first address; and
   determine the first path information based on the indication information, the second indication information, and the identifier of the first user plane network element.

18. The service management network element according to claim 17, wherein the second indication information is a second address, wherein the second address is a source address corresponding to the data for which no path information can be matched by the second user plane network element, wherein the instructions, when executed by the at least one processor, further cause the service management network element to send a fifth message to a first session management network element, wherein the fifth message is for configuring a third routing rule on the first user plane network element, wherein the fifth message comprises the indication information, the second address, the identifier of the first user plane network element, and fourth path information, wherein the third routing rule comprises the indication information, the second address, and the fourth path information, and wherein the fourth path information indicates routing data whose destination address is the second address to the second user plane network element.

19. The service management network element according to claim 17, wherein the instructions, when executed by the at least one processor, further cause the service management network element to:
   receive a sixth message from the second session management network element, wherein the sixth message comprises the indication information, an identifier of the second user plane network element, and the first address, and wherein the sixth message is to cancel updating of path information associated with the indication information, the first address, and the identifier of the second user plane network element; and
   stop, based on the sixth message, sending, to the second session management network element, the path information associated with the indication information, the first address, and the identifier of the second user plane network element.

20. A second session management network element, comprising:
   at least one processor; and
   a memory coupled to the at least one processor and having program instructions stored thereon which, when executed by the at least one processor, cause the second session management network element to:
      receive a first message from a service management network element; and
      send, based on the first message, a first routing rule to a second user plane network element,
   wherein the first routing rule is for configuring the first routing rule on the second user plane network element,
   wherein the first routing rule comprises indication information of a local area network, a first address, and first path information associated with the first address,
   wherein the first path information indicates routing data whose destination address is the first address to a first user plane network element, and
   wherein the first user plane network element provides access to the local area network for a terminal corresponding to the first address.

* * * * *